US012334104B2

United States Patent
Newland et al.

(10) Patent No.: US 12,334,104 B2
(45) Date of Patent: Jun. 17, 2025

(54) METHOD AND SYSTEM FOR TIME AND FEATURE MODIFICATION OF SIGNALS

(71) Applicant: SYNCHRO ARTS LIMITED, London (GB)

(72) Inventors: Jonathan Newland, Epsom (GB); Phillip Jeffrey Bloom, Epsom (GB); William John Ellwood, Epsom (GB)

(73) Assignee: SYNCHRO ARTS LIMITED, Epsom (GB)

( * ) Notice: Subject to any disclaimer, the term of this patent is extended or adjusted under 35 U.S.C. 154(b) by 183 days.

(21) Appl. No.: 17/875,816

(22) Filed: Jul. 28, 2022

(65) Prior Publication Data
US 2023/0032838 A1     Feb. 2, 2023

(30) Foreign Application Priority Data
Jul. 28, 2021    (GB) ...................................... 2110883

(51) Int. Cl.
*G10L 25/51* (2013.01)
*G10L 25/78* (2013.01)
*G11B 27/10* (2006.01)

(52) U.S. Cl.
CPC .............. *G10L 25/51* (2013.01); *G10L 25/78* (2013.01); *G11B 27/10* (2013.01)

(58) Field of Classification Search
CPC ......... G10L 25/51; G10L 25/78; G10L 25/93; G10L 2025/786; G10L 21/01; G10L 21/013; G11B 27/10; G10H 2210/066; G10H 2210/091; G10H 2240/141; G10H 2250/455
See application file for complete search history.

(56) References Cited

U.S. PATENT DOCUMENTS

| | | | |
|---|---|---|---|
| 4,591,928 A * | 5/1986 | Bloom | G11B 27/10 |
| | | | 360/13 |
| 5,750,912 A | 5/1998 | Matsumoto | |
| 5,966,687 A | 10/1999 | Ojard | |

(Continued)

FOREIGN PATENT DOCUMENTS

| | | |
|---|---|---|
| GB | 2117168 A | 10/1983 |
| WO | 2004040576 A8 | 10/2004 |

OTHER PUBLICATIONS

Soens, Pieter, et al., "Signal Processing", Signal processing 92 (2012), pp. 439-454.

(Continued)

*Primary Examiner* — Fariba Sirjani
(74) *Attorney, Agent, or Firm* — Thomas Horstemeyer, LLP

(57) ABSTRACT

The application relates to a computer implemented method and system for modifying at least one feature of an input audio signal based on features in a guide audio signal. The method comprises: determining matchable and unmatchable sections of the guide and input audio signals; generating a time-alignment path for modifying the at least one feature of the input audio signal in the matchable sections of the input audio signal based on corresponding features in the matchable sections of the guide audio signal, based on the time-alignment path, modifying the at least one feature in the matchable sections of the audio input signal.

18 Claims, 16 Drawing Sheets

(56) References Cited

U.S. PATENT DOCUMENTS

| | | | |
|---|---|---|---|
| 6,266,637 B1* | 7/2001 | Donovan | G10L 13/06 |
| | | | 704/258 |
| 6,836,761 B1 | 12/2004 | Kawashima | |
| 6,967,275 B2 | 11/2005 | Ozick | |
| 7,437,290 B2* | 10/2008 | Danieli | G10L 15/08 |
| | | | 704/E21.001 |
| 8,009,966 B2* | 8/2011 | Bloom | G11B 27/34 |
| | | | 704/235 |
| 8,239,199 B2* | 8/2012 | Bhamidipati | G10L 21/04 |
| | | | 704/254 |
| 8,244,546 B2 | 8/2012 | Nakano | |
| 9,324,330 B2 | 4/2016 | Chordia | |
| 9,547,642 B2* | 1/2017 | Potkonjak | G06F 40/58 |
| 10,453,475 B2* | 10/2019 | Venkataramani | G06F 3/165 |
| 10,803,842 B2 | 10/2020 | Lyske | |
| 11,538,456 B2* | 12/2022 | Lai | H04N 21/8106 |
| 2002/0040295 A1 | 4/2002 | Saunders | |
| 2005/0042591 A1* | 2/2005 | Bloom | G11B 27/34 |
| | | | 434/308 |
| 2007/0276657 A1 | 11/2007 | Gournay | |
| 2013/0151251 A1* | 6/2013 | Herz | G10L 21/00 |
| | | | 704/235 |
| 2018/0034435 A1* | 2/2018 | Stegner | G10L 21/14 |
| 2020/0312290 A1 | 10/2020 | Sullivan | |
| 2023/0197093 A1* | 6/2023 | Morrison | G10L 15/02 |
| | | | 704/232 |

OTHER PUBLICATIONS

PCT International Search Report for PCT/GB2022/051994, mailed Oct. 13, 2022.

Combined Search and Examination Report in Great Britain Application No. GB2110883.2, dated 0/14/2022.

Bloom, P.J., "Use of Dynamic Programming for Automatic Synchronization of Two Similar Speech Signals", ICASSP IEEE International Conference on Acoustics, Speech, and Signal Processing, vol. 9, Jan. 1, 1984.

* cited by examiner

METHOD AND SYSTEM FOR TIME AND FEATURE MODIFICATION OF SIGNALS

CROSS REFERENCE TO RELATED APPLICATIONS

This application claims priority to and the benefit of Great Britain Application No. GB 2110883, filed Jul. 28, 2021, which is hereby incorporated by reference herein in its entirety.

TECHNICAL FIELD

This invention relates to problems that arise in modifying features in one digitized sound signal based on features in another digitized sound signal, when large sections of features in the first and second sound signals are mismatched.

BACKGROUND OF THE INVENTION

Techniques for manipulation of a recorded signal to match or align with a first recorded signal are known from U.S. Pat. Nos. 4,591,928B, 7,825,321B, and 8,009,966B2, which have one or more inventors in common with the present disclosure, and which are incorporated by reference herein.

It is known that it can be quite difficult for actors, vocalists and musicians to replicate the exact timing (and sometimes pitch and dynamics) of a phrase of spoken or sung words or instrumental phrases. There is therefore a desire, and often a requirement, for ensuring that there is very close replication of timing and other features of a recorded signal to another signal in professional audio productions. These include, for example, 1) lip-syncing replacement dialogue for films or television shows as well as modifying intonation (pitch), loudness or other features; 2) double-tracking a vocal melody or harmony in the recording of a song, to make multiple singers and/or instruments sound tighter and clearer (i.e. more similar in features including timing, pitch and dynamics); and 3) making timing (and other features) of harmonies tighter to improve clarity and intensity.

It is even more difficult for non-professionals to match timing or pitch patterns in software based applications provided on a computer, phone, or via the internet, designed to allow users to replace the original voices in feature film or TV programs with their own lip-synched voice or match the original vocalists' performances in karaoke-type products with or without video. An example is described in U.S. Pat. No. 8,009,966B which is incorporated by reference herein.

Methods for the modification of a second recorded signal to match the timing of a first recorded signal have been described in U.S. Pat. No. 4,591,928 B. Methods for the modification of specified features (such as pitch or loudness) in a second recorded signal to match those in a first recorded signal based on a time-alignment mapping of the two signals is further described in U.S. Pat. No. 7,825,321 B1. By way of background we note that the techniques described in these patents are incorporated in professional products, including VocAlign® and Revoice Pro® made by Synchro Arts Ltd and included in consumer products such as Revoice Singtone and Sing Perfect Studio.

As taught in the U.S. Pat. Nos. 4,591,928 B and 7,825,321 B1 patents mentioned above, and as will later be described with reference to FIG. 1, a known time- and feature-matching process is sub-divided into three or four main steps: 1) measuring time-varying features of the first (Guide) and second (Dub) signals; 2) comparing these features to find the best time-alignment path; 3) optionally, editing the second signal's timing; and 4) optionally, modifying any user-selected features of the second signal to match those of the first signal.

These methods work acceptably well when the first and second signal are generally similar in content (e.g., words or notes) that have roughly similar timing and positioning of the audio to be aligned from the start of each selected Guide and Dub sections. In addition, a range of differences between signals can be accommodated such as higher noise levels in the first (and/or second) signal, or "naturally occurring" similar timing differences in the matching pairs of gaps between what could be considered signal and what would be considered low level noise or silence.

However, the described methods for time-alignment in the prior art have several short-comings, particularly when attempting to match longer signals (i.e., greater than 30 or 60 seconds) which are not consistently similar. Examples of this include when one or both of the selected Guide and Dub signals have long gaps containing low levels of noise or silence before, during or after stretches where an audio signal of interest appears, and that are not present in the other signal at the same time, as shown in FIG. 2 for example. These discontinuities in the signal, as well as a number of other signal conditions, mean there may be unmatchable areas of the two signals, and this can cause the known alignment algorithms described severe problems.

We have appreciated that it would be desirable to provide a technique for time or feature aligning audio features in two signals, specifically a technique that is able to accommodate difference in the signals, and operate effectively despite one more discrepancies or discontinuities existing between the two signals in the time domain.

In this regard, it is helpful to consider some specific examples of recorded signals that would benefit from such audio alignment methods. These include examples such as in dialogue replacement, where two or more actors are speaking alternatively in the location recording but only one actor is replacing their spoken part and being silent when the other actors are speaking; in singing, where one voice sings more continuously than a second voice, such that the second voice is only present at certain times and not at others, thereby leaving gaps of silence in the second voice that are not in the first; one or more backing singers singing at certain times when the first singer is not singing; and a recorded Karaoke singer who stops and starts as the song requires for long durations (such as during an introduction or instrument solo) and whose voice is intended to be automatically altered by processing to match the details of the original vocalist's performance.

Theoretically, these situations can be dealt with using the alignment methods by relying on intervention from the operator. First, the operator can arrange for the two recorded signals to both roughly match in start and stop times, before submitting them to the processor for alignment. Alternatively, when setting up the processor, the operator can review the signals and deliberately select pairs of sections that appear to only contain potentially matchable signals, thereby avoiding processing signal areas that do not contain matchable signals. Such manual intervention, however, requires more user effort, consumes more time and can suffer from mistakes in selections.

Looking in more detail at FIG. 2, it shows a typical section of recorded vocals in a digital audio workstation that has various singers in the lower tracks either doubling or harmonizing with the top track's lead vocal. All the tracks below the top lead one are candidates to be aligned and pitch matched (if they are double tracks) to the lead vocal and time aligned if they are harmonies. This figure illustrates many of the ways in which the start and end times of the Dub signals under the Lead voice track can vary, and how individually selecting each Guide section to "pre match" the length of each Dub track selected for processing would be time consuming and tedious.

The unedited Dub signals will be similar to the Guide signals in one or more indeterminate length blocks, but within these blocks, detailed audible features (phonemes and other types of sounds, including plosives, vowel sounds, breaths, musical instrument noises and notes, etc.) will not be precisely in time with the corresponding Guide's features to be acceptable as is for the purpose of the recorded product being produced. Examples include: a) dialogue replacement recordings where lip synch discrepancies as small as 30 to 60 ms will be perceivable and possibly disturbing to the audience; and b) in popular music, where the Dub is a double track or harmony that goes with, say, a lead vocal Guide, and there are discrepancies greater than 40 ms which may not sound as "tight" as modern production standards demand in some genres.

Conversely, selecting lengthy dissimilar sections of signals (as shown above) to provide to an alignment process, can confuse the method so much that the alignment of the signals can fail completely. This can result in an output signal that is grossly mistimed and/or time-distorted and, therefore, unusable.

We have therefore appreciated that it would be desirable to provide a technique which can recognize which sections in one or more audio signals (at least a guide or master and a dub track) are matchable and which are unmatchable (because they differ or diverge too significantly), and carry out the time and or feature alignment process accordingly. The types of signals we are expecting will contain Guide and Dubs containing sounds that are intended to match each other and starts and stops will be close (in a range of 0.25 to 0.5 second) because music will normally have a beat to match and dialogue replacement often has start/end countdowns or indicators.

SUMMARY OF THE INVENTION

The invention is defined in the independent claims to which reference should now be made. Advantageous features are set forth in the dependent claims.

In a first aspect, a computer implemented method is provided for modifying one or more features of an input audio signal based on one or more features in a guide audio signal. The method comprises: comparing one or more audio features in the guide audio signal with one or more corresponding features in the input audio signal to determine a matchability signal, the matchability signal indicating matchable sections of the input audio signal having audio features that can be modified to match the guide audio signal, and unmatchable sections of the input audio signal having audio features that cannot be modified to match the guide audio signal; modifying one or more audio features in the input audio signal in dependence on the matchability signal.

The method optional comprises generating a time-alignment path mapping the timing of one more features of the input audio signal to the corresponding features in the guide audio signal, based on the time-alignment path, modifying the at least one feature in the matchable sections of the audio input signal.

Based on the matchability signal, the method may comprise modifying the matchable sections of the input audio signal such that one or more features in the input audio signal are matched to the guide audio signal, and/or, selectively modifying the timing features of the unmatchable sections of the input audio signal.

Optionally, determining the matchable and unmatchable sections of the two audio signals may further comprise: dividing the guide audio signal and the input audio signal into a plurality of time frames; analyzing the plurality of time frames in the guide audio signal and the input audio signal, and classifying the plurality of time frames into frames with a sufficient signal level and time frames with an insufficient signal level, determining that frames of the guide audio signal or the input audio signals that have an insufficient signal level are unmatchable sections.

The determination of whether a frame has an insufficient signal level may further comprise: determining the noise floor and/or dynamic range of the guide audio signal and input audio signals in each respective time frame of the plurality of time frame, and determining a signal threshold based on the determined noise floor and dynamic range; comparing the signal in the time frame of the signal against the signal threshold.

Optionally, analyzing and classifying the frames of the guide audio signal and the input audio signal into sufficient and insufficient signal, comprises classifying the frame as being voiced or unvoiced, with reference to the noise floor and/or dynamic range of the guide audio signal and input audio signals, and a voiced threshold.

Optionally, determining the matchability signal comprises dividing the guide audio signal and input audio signals into a plurality of time frames, and labeling each of the plurality of frames with one of a plurality of matchability values indicating the degree to which the input audio signal can be modified to match with the guide audio signal.

Further, the method may comprise depending on the matchability value assigned to each time frame, selecting one of a plurality of different predetermined types of audio processing to apply to the time frame of the input audio signal.

In embodiments, the at least one feature of the audio signal to be modified includes one or more of: the timing of the audio signal, pitch, loudness, frequency, spectral energy, and/or amplitude.

Further, the matchability signal may be determined based on features including one or more of: the timing of the audio signal, pitch, loudness, frequency, spectral energy, and/or amplitude.

In a second aspect, a system for modifying one or more features of an input audio signal based on one or more features in a guide audio signal is provided. The system comprises a processor configured to: compare one or more audio features in the guide audio signal with one or more corresponding features in the input audio signal to determine a matchability signal, the matchability signal indicating matchable sections of the input audio signal having audio features that can be modified to match the guide audio signal, and unmatchable sections of the input audio signal having audio features that cannot be modified to match the guide audio signal; and modify one or more audio features in the input audio signal in dependence on the matchability signal.

The processor may be further configured to generate a time-alignment path mapping the timing of one more features of the input audio signal to the corresponding features in the guide audio signal, based on the time-alignment path, modifying the at least one feature in the matchable sections of the audio input signal.

Optionally, the processor may be configured to: based on the matchability signal, modifying the matchable sections of the input audio signal such that one or more features in the input audio signal are matched to the guide audio signal, and/or, selectively modifying the timing features of the unmatchable sections of the input audio signal.

Optionally, determining the matchable and unmatchable sections of the two audio signals may further comprise: dividing the guide audio signal and the input audio signal into a plurality of time frames; analyzing the plurality of time frames in the guide audio signal and the input audio signal, and classifying the plurality of time frames into frames with a sufficient signal level and time frames with an insufficient signal level, determining that frames of the guide audio signal or the input audio signals that have an insufficient signal level are unmatchable sections.

The determination of whether a frame has an insufficient signal level may further comprise: determining the noise floor and/or dynamic range of the guide audio signal and input audio signals in each respective time frame of the plurality of time frame, and determining a signal threshold based on the determined noise floor and dynamic range; comparing the signal in the time frame of the signal against the signal threshold.

Optionally, analyzing and classifying the frames of the guide audio signal and the input audio signal into sufficient and insufficient signal, comprises classifying the frame as being voiced or unvoiced, with reference to the noise floor and/or dynamic range of the guide audio signal and input audio signals, and a voiced threshold.

Optionally, determining the matchability signal comprises dividing the input guide audio signal and input audio signals into a plurality of time frames, and labeling each of the plurality of frames with an identifier indicating whether the individual frame has been determined as matchable or unmatchable.

Further, the processor may be configured to divide the guide audio signal and input audio signals into a plurality of time frames, and label each of the plurality of frames with one of a plurality of matchability values indicating the degree to which the input audio signal can be modified to match with the guide audio signal.

Optionally, determining the matchability signal comprises depending on the matchability value assigned to each time frame, select one of a plurality of different predetermined types of audio processing to apply to the time frame of the input audio signal.

In embodiments, the at least one feature of the audio signal to be modified includes one or more of: the timing of the audio signal, pitch, loudness, frequency, spectral energy, and/or amplitude.

Further, the matchability signal may be determined based on includes: includes one or more of: the timing of the audio signal, pitch, loudness, frequency, spectral energy, and/or amplitude.

DESCRIPTION OF THE DRAWINGS

Example embodiments of the invention will now be described by way of example and with reference to the drawings in which.

EXAMPLE EMBODIMENTS

Before explaining how the new modifications are incorporated into the alignment process, the prior art processing methodology is described in further detail with reference to FIG. 1. The term "Guide" is used for the signal providing the timing reference and optional target features selected for transferring, and the term "Dub" is used for the signal which is being modified to have its timing and/or other features match those of the Guide via the aligned feature transferring methods.

Figure 1:
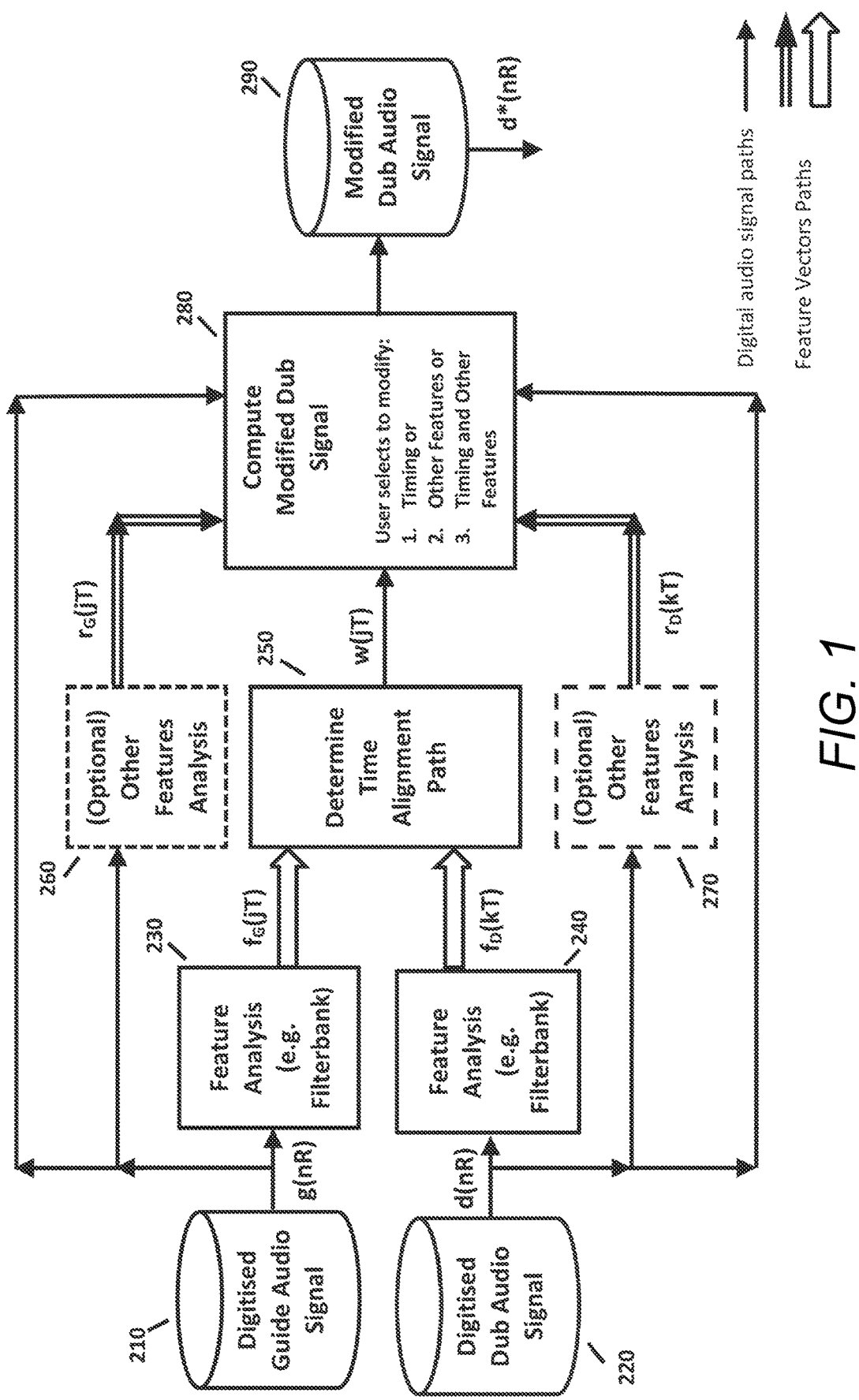
FIG. 1 is a functional block diagram illustrating a known technique for time and feature alignment of a Guide audio signal and a Dub signal.
Figure 2:
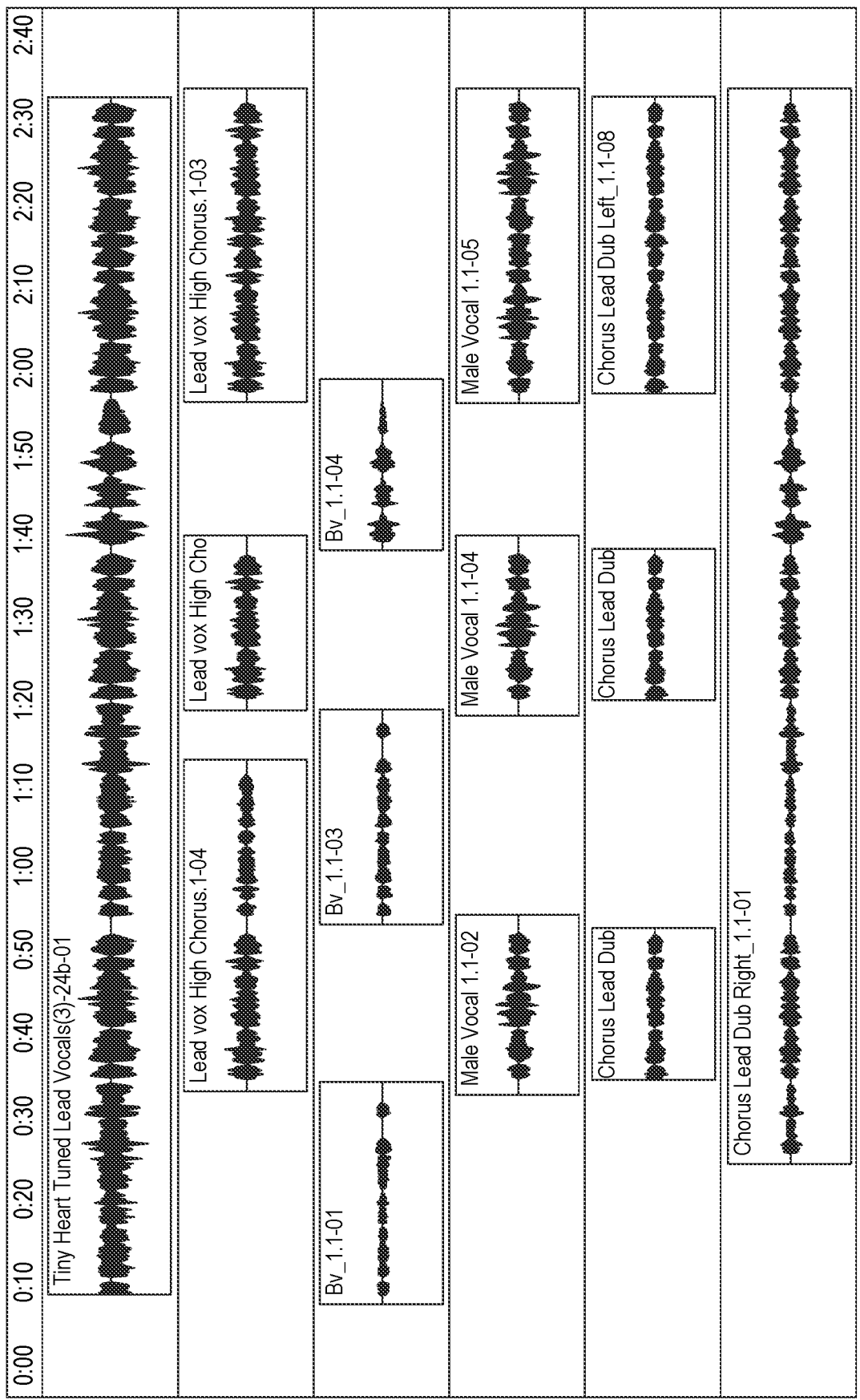
FIG. 2 is a schematic illustration of audio signal components, showing a Guide signal and a plurality of Dub signals.

FIG. 1 shows a functional block diagram representing the processing steps implemented by control logic on a computer to time and feature align the recorded Dub audio signal with the recorded guide audio signal. Digitized guide audio signal g(nR) and digitized Dub audio signal d(nR) are initially illustrated recorded in computer memory 210 and 220 where they are input to the process in which the Dub audio signal d(nR) 220 is to be time aligned to the digitized Guide audio signal g(nR) 210 using computer-based digital signal processing.

The digitized Guide signal g(nR) is passed to feature analysis block 230 where it is sampled at sample rate 1/R (where R is typically 41,000 Hz) and where it undergoes speech parameter (or feature) measurement processing (e.g. spectral energy). The variable n is data frame number. The feature analysis block 230 can be implemented as a digital processor (e.g. an N-band digital filter bank) 230 that provides as output a sequence of feature vectors $f_G(jT)$ at frame rate 1/T, where 1/T is typically 100 Hz.

The digitized Dub audio signal d(nR) also undergoes measurement in a second but identical feature measurement process 240 to create a sequence of feature vectors $f_D(kT)$. The variables j and k are data frame numbers for the Guide and Dub "tracks" respectively starting at 0, and T is the analysis interval. The signals of interest do not necessarily start at j or k=0 in the Guide and Dub tracks often starting elsewhere.

As illustrated in FIG. 1, the guide audio signal g(nR) and dub audio signal d(nR) may be passed to other logical blocks in the process, such as further feature analysis blocks 260 and 270, and computation block 280.

From first feature analysis blocks 230 and 240, the Guide feature vectors $f_G(jT)$ and Dub feature vectors $f_D(kT)$ are then passed to time-alignment processor 250 to determine a time-warping function w(jT). As will be described later, the time warping function w(jT) provides a time-warping path (time alignment path) between the vectorised dub audio signal and the vectorised guide audio signal, in order to bring the dub audio signal into alignment with the guide the signals. The time warping path is (on a frame-by-frame basis) the sequence of dub parameter vectors that best matches the fixed sequence of guide parameter vectors by allowing dub frames to be repeated or omitted. In this regard, a frame can be understood as a sequence of digits in the respective vectors $f_G(jT)$ and $f_D(kT)$ having a notional starting point and length in time T.

Figure 3:
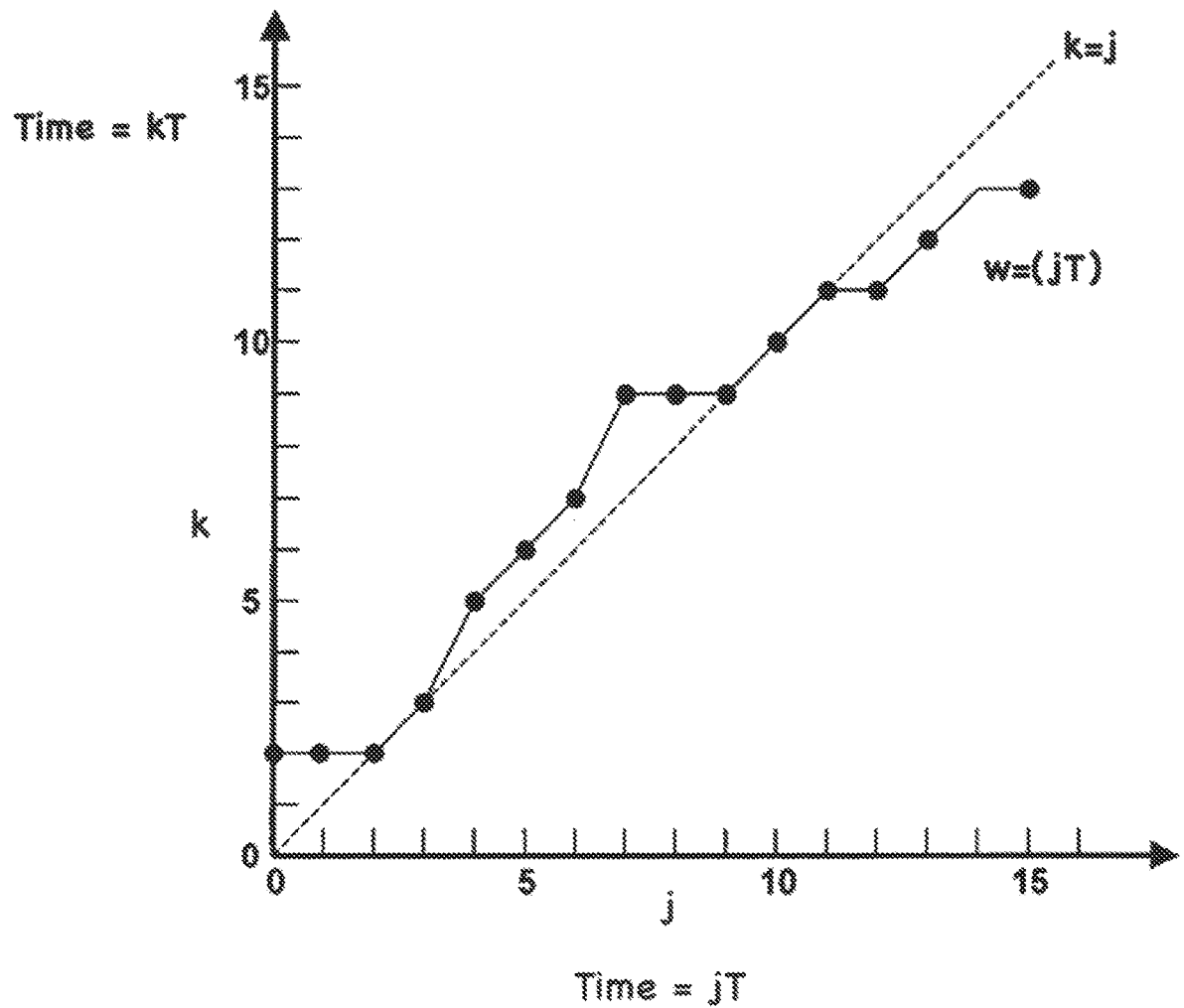
FIG. 3 is an illustration showing a time warping path providing the best match between a one dimensional replacement vector and a one dimensional reference vector.
Figure 4A:
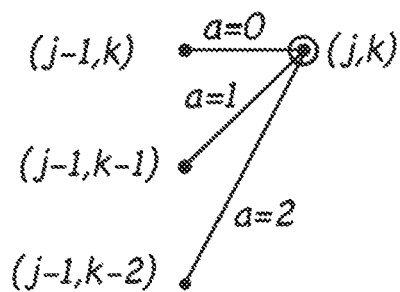
FIG. 4a is a graphical representation of FIG. 3 showing allowed paths in the time-alignment process.
Figure 4B:
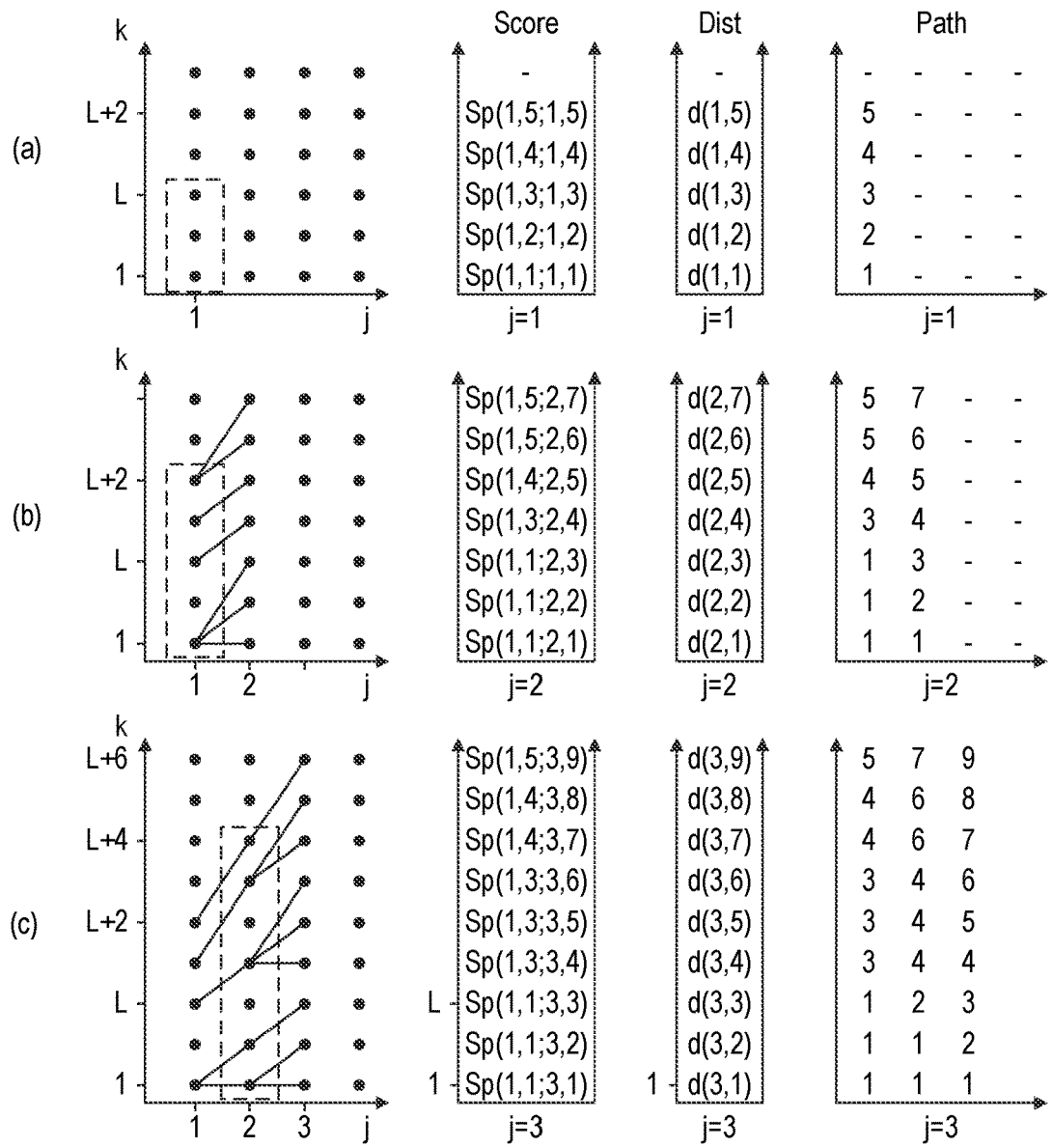
FIG. 4b is a numerical representation of example data arrays in the time-alignment process.

FIGS. 3, 4a and 4b describe how the time alignment process between the two vectorised representations of the audio signals is carried out. This process is described in more detail in U.S. Pat. Nos. 4,591,928 B and 7,825,321 B1 mentioned above, and incorporated here by reference.

An example time warping path (time alignment path) is shown in FIG. 3. This consists of the values for each k as a function of the values of j associated with the corresponding features, and thereby, indicates the amount of time expansion or compression of the waveform data of the Dub audio signal needed to align its time-dependent features with the corresponding features of the Guide signal.

Some parameters of the vectors $f_G(jT)$ and $f_D(kT)$ may also be used in the time alignment processor 250 to classify successive regions of the new dialogue signal into speech and silence and from that process to produce speech/silence classification data c(jT). The classification data c(jT) may be used in the time alignment processor 250 to determine the time warping function w(jT), but in this prior art example has no other function. The w(jT) data is then used in a signal editing processer 280 for generating the corresponding editing instructions for the Dub audio signal d(nR), so that the editing can be carried out in a process in which periods of silence or audio are lengthened or shortened to provide the required alignment. Other feature classification data may also be used in the signal editing processor 280, including variables such as pitch data MP(kT) which is described later in FIG. 13, and optionally other features measured in the digital processors 260 and 270. The user may choose to have the Dub audio timing match the Guide or not and may choose to have other measured signal attributes altered or not. The process for editing the Dub audio signal d(nR) is carried out in block 280. The resulting edited digitized output signal data d*(nR) can then be output from digital storage 290 and used as a replacement, double track, harmony track, dialogue replacement etc. depending on the type of audio this processing is being used for.

FIGS. 4a and 4b detail some of the main steps used here and in the time alignment algorithm discussed in U.S. Pat. Nos. 4,591,928 B and 7,825,321 B1 to generate the alignment path in FIG. 3. As an example, the parameter vectors demonstrated in FIGS. 4a and 4b represent spectral cross sections of the Guide and Dub speech signals. To make comparisons of the similarity between a Dub and a Guide spectral cross section, a simple distance metric can be used which compares not the original parameter vectors, but ones that have been processed to emphasize mainly the differences in speech patterns and to not be sensitive to environmental or recording conditions. The Dub frame index sequence, i.e. the sequence of values of k, which produces the best alignment of Dub parameter vectors with those of the Guide at each frame j, defines the time warping path expressed as the time warping function w(jT) which will be input to the signal editing processor 280, as described above in FIG. 1.

The time alignment algorithm creates a number of paths starting from different origins in parallel, with each path produced describing the best sequence from the starting to the final point. What is the "best" is determined by creating a "dissimilarity Score" for every path being explored for aligning the two signals, based on the measured feature vector comparisons at frames (j,k) incorporated along that path. The path with the lowest dissimilarity Score would be deemed the optimal one and defines w(jT). A computer process known as Dynamic Programming (DP) as described in J. S. Bridle (1982) may be utilized for generating w(jT), although other means, including machine learning or other optimization algorithms, could be used.

The key aspect of using DP is that the best step to a new end point at $j=j_e$, $k=k_e$ is found by starting at the new end point and searching backwards to at most three previous best path ends at $j=j_e-1$, $k=k_e-a$ (where a=0,1, or 2), and connecting the new end point to the path which generates the best (i.e. lowest) dissimilarity Score.

Two main principles are used in determining w(jT): (1) the optimum set of values of j for the whole range of j from 1 to J is also optimum for any small part of the range of j; and (2) the optimum set of values of k corresponding to the values of j from $j_s$ to any value $j_e$ for which there is a corresponding $k_s$ and $k_e$ depends only on the values of k from $k_s$ to $k_e$. The subscripts 's' and 'e' represent 'start' and 'end', respectively. This process is illustrated in FIG. 4a, which depicts the allowed paths in the (j,k) plane to a point (j,k) in the DP step. In particular, if a=0, signifying that a replacement frame is repeated (i.e. a horizontal step in the (k,j) plane), or if a=2, signifying that a single replacement frame has been skipped (i.e. a lower diagonal step in the (j,k) plane), then different (positive) numeric penalties are added to that path's Score. For a=1 (i.e. a diagonal step in the (j,k) plane), which creates no time distortion to the output, no penalty needs to be included.

Several data arrays are used to hold the required data, an example of which is shown in FIG. 4b. First, for each new possible path end within the window, a corresponding path score will be kept in a data array named SCORE (i.e. total Dissimilarity Score). The scores for the L different paths are all initially set to zero. Next, L+2 spectral distances are independently computed between the reference vector at k=1 and the vectors of each of the first L+2 replacement frames from j=1 to j=L+2. These distances are held in a second data array name DIST. The two extra distance measures are made available to enable the DP step to extend the path ending at (1,L) along the lower diagonal in the (j,k) plane to (2,L+2). This action of extending the window by two units of k at each step of j steers the top of the path exploration window up (towards higher k) at a maximum slope of 2:1 as is illustrated by the graphical representations of the (j,k) plane at (a), (b) and (c) in FIG. 4b.

Using the computed distances and the array of previous scores, the algorithm (also known as 'ZIP') computes a new best score independently for each of the L+2 new endpoints using the DP equation and, at the same time, saves in a two-dimensional array of path elements named PATH the corresponding index of k which provided each best step. The index indicates the frame index from which the best step was made, therefore each index is actually a pointer to the previous frame's path end. Successive pointers generate a path which can be traced back to its origin. The PATH array holds a multiplicity of such strings of pointers. The SCORE, DIST and PATH arrays are shown in FIG. 4b at (a), (b) and (c) with typical data held after the DP step has been made for k=1, 2 and 3 respectively. Each element in the SCORE array corresponds to a unique path end and sequence of previous path elements which led to that score. Each unique path is held as a row in the PATH array with the same index as the corresponding score in the SCORE array.

Having described the prior art with reference to FIGS. 1 to 4 above, a first embodiment of the invention will now be described with reference to FIG. 5. For ease of reference processes that are identical to the prior art will be given the same reference numbers.

Embodiments of the invention provide the means to be able to align the matchable sections of the entire timespan of a Guide and Dub audio signal, while leaving the unmatchable sections largely unaltered. This removes the need for the manual identification and selection of matchable signal ranges described above. In addition it allows the operator to process longer durations of two signals without regard to where the gaps in silence and other major discrepancies arise. This makes the task of audio alignment and feature transfer simpler, faster, more reliable and accurate. The purpose of this improvement is to position the start and end of sections of the Guide's processing to be based on where continuous runs of the Dub's significate content are positioned in time.

In some embodiments of this invention, in order to demarcate the start and end of the matchable sections correctly and accurately, a pre-processing classification may be provided to run over the entire range of both the Guide and Dub audio signals to determine the most likely position of the boundaries between any matchable and unmatchable sections of two signals and generate a time varying signal indicating the approximate "matchability". This may be followed by a modified Time Alignment algorithm to time align not only the matchable time-dependant features but also incorporate the alignment of the unmatchable ranges to optimize the matchable ranges. The modified Time alignment algorithm receives the initial approximate boundary information for each pair of matching Guide/Dub sections as well as receiving the frame by frame matchable signal data to use when computing the alignment path for the entire selected signal. The 'matchable' features may be defined as roughly similar features. The subsequent time- and feature-editing processing of the Dub audio signals may be carried out as described in the prior signal modifications methods in FIG. 1.

It is also proposed that other improvements could result by having further levels or categories of signal matching to allowing for more refined modifications to the warp path creation and feature processing. Signal matching information could also inform more intelligent control of the signal modification processing based on the parameters being compared, such as pitch, loudness or other extractible features. These other types of discrepancies can be measured before a decision process selects what extra processing needs to be applied (e.g. if one decides singing is not a double but a harmony—one could apply different types of pitch correction if required). However, this again will need time-alignment information before one can measure and determine the actual discrepancies at the relevant corresponding locations in the signals and so the solution to this matter will be of similar nature to defining unmatchable areas FIG. 5 shows a block diagram of a time alignment and modification process according to an embodiment of the present invention. A digitized Guide audio signal g(nR) 210 and a digitized Dub audio signal d(nR) 220 are input respectively into a set of processors. Each of the two audio signals may be input in three different routes as shown by the three arrows pointing from each of the two audio signals which are noted as three pairs of input for the following description. One pair of the input may be directed from the Guide and Dub audio signals to digital processors (e.g. N-band digital filter bank) 230 and 240, respectively. As described above in FIG. 1, the corresponding feature vectors of the Guide and Dub audio signals are generated as $f_G(jT)$ and $f_D(kT)$, respectively. A second pair of the inputs may be directed from the Guide and Dub audio signals to another digital processor 260 and 270 which optionally analyze some other features of the audio signals $r_G(jT)$ and $r_D(kT)$. These other feature vectors may be input to an editing processor 280 for signal modifications. A third pair of the inputs may be directly pointed from the Guide and Dub audio signals to the editing processor 280. The feature vectors $f_G(jT)$ and $f_D(kT)$ generated through the first pair of inputs are then directed to block 500 for a set of processing to compute matchable/unmatchable signals M(kT) before going through the time alignment process.

Figure 5:
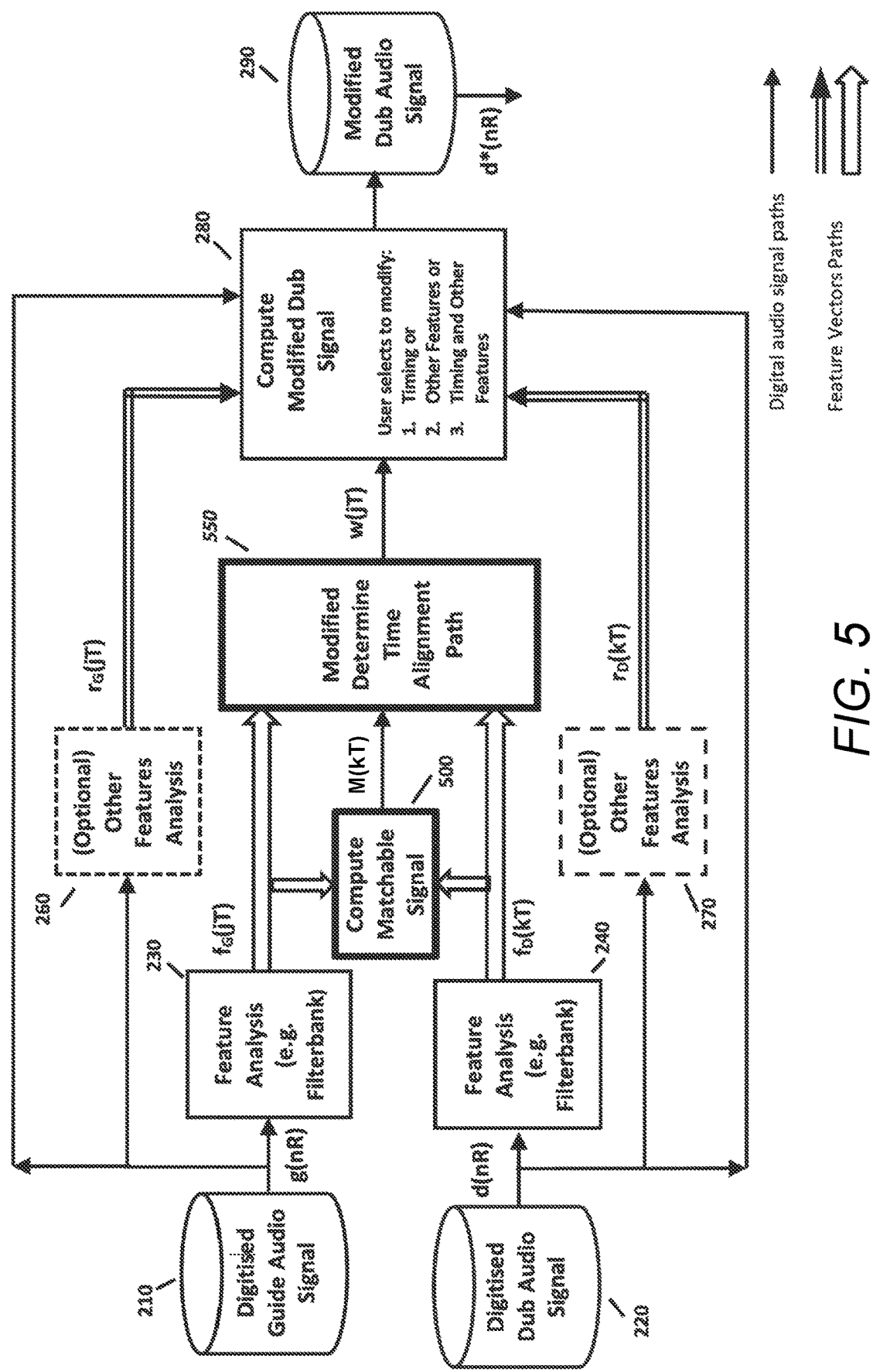
FIG. 5 is a functional block diagram illustrating an embodiment of the invention.
Figure 6:
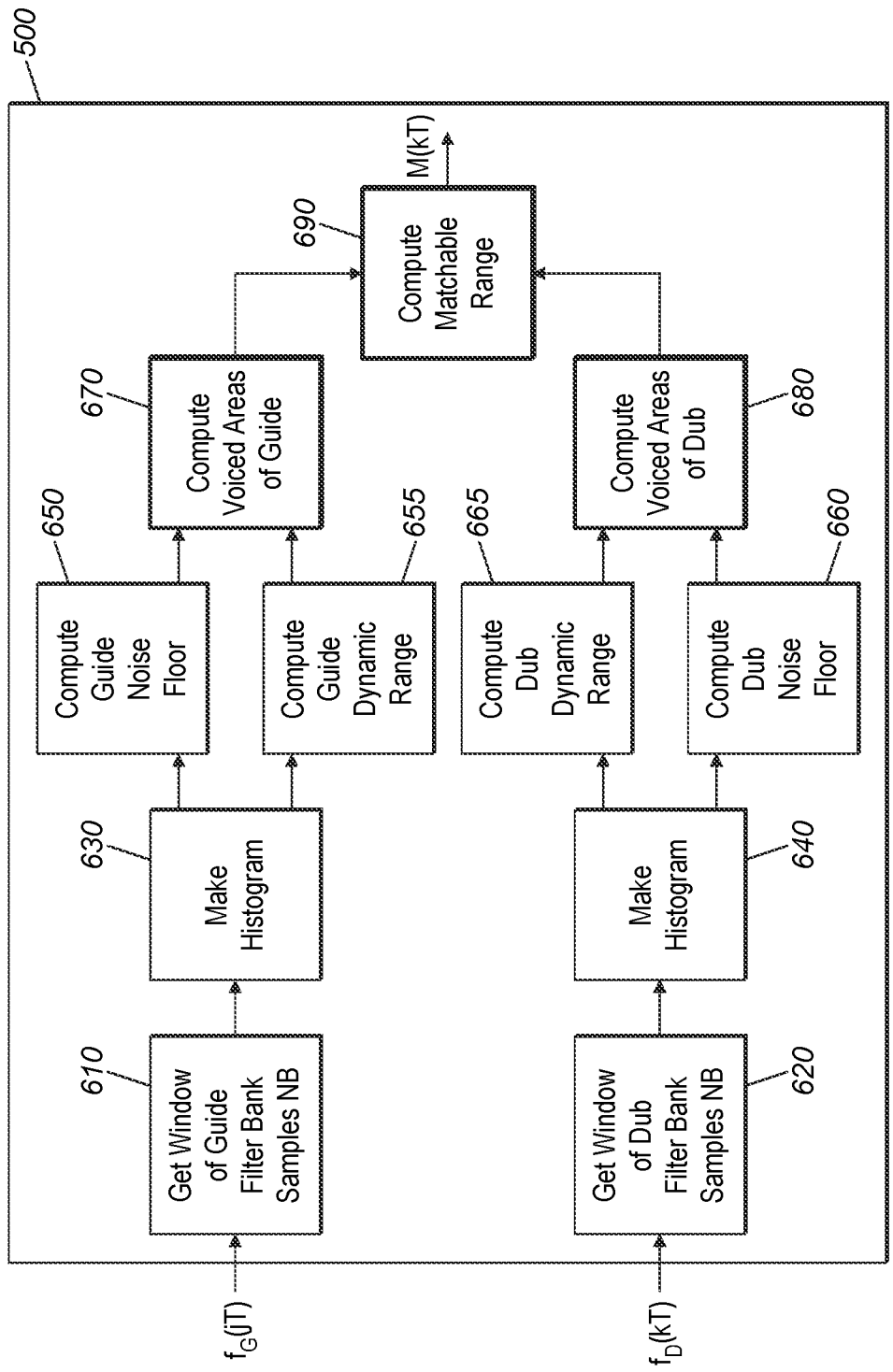
FIG. 6 is a functional block diagram illustrating a further part of the process of FIG. 5

FIG. 6 shows a functional block diagram illustrating a further part of the process of FIG. 5. The process starts from the input of feature vectors $f_G(jT)$ and $f_D(kT)$, getting sets of the Guide Filter Bank frames and Dub Filter Bank frames at first steps 610 and 620 in parallel as shown in FIG. 6. These frames may then be used for making histograms at steps 630 and 640 for further computing the Noise Floor and Dynamic Range of the Guide and Dub frames at steps 650, 655, 660 and 665, respectively. These steps described so far are mostly disclosed in U.S. Pat. No. 4,591,928A. The steps carried out in the blocks 670 and 680 are two extra steps added according to embodiments of this invention. Blocks 670 and 680 operate for computing the voiced areas across the Guide and Dub frames, which may be input to the block 500 (also shown in FIG. 5). A detailed process for computing the voiced areas of Guide and Dub frames, including calculating a voiced threshold from Noise Floor and Dynamic Range, is described in FIG. 9 (Flowchart 2).

Figure 7:
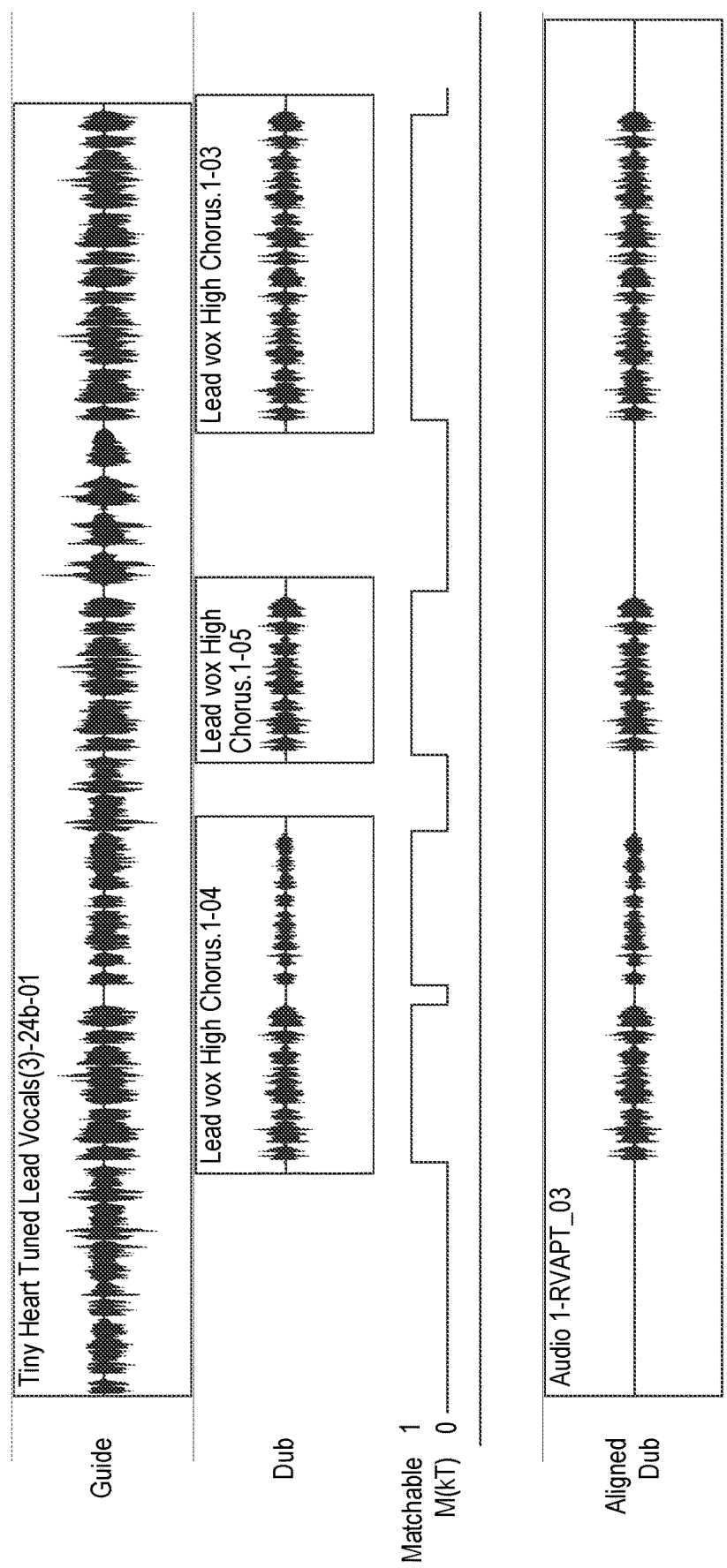
FIG. 7 is a graphical illustration of an output signal showing matchable and unmatchable sections of the dub signal illustrated by a matchable vector notation.
Figure 9:
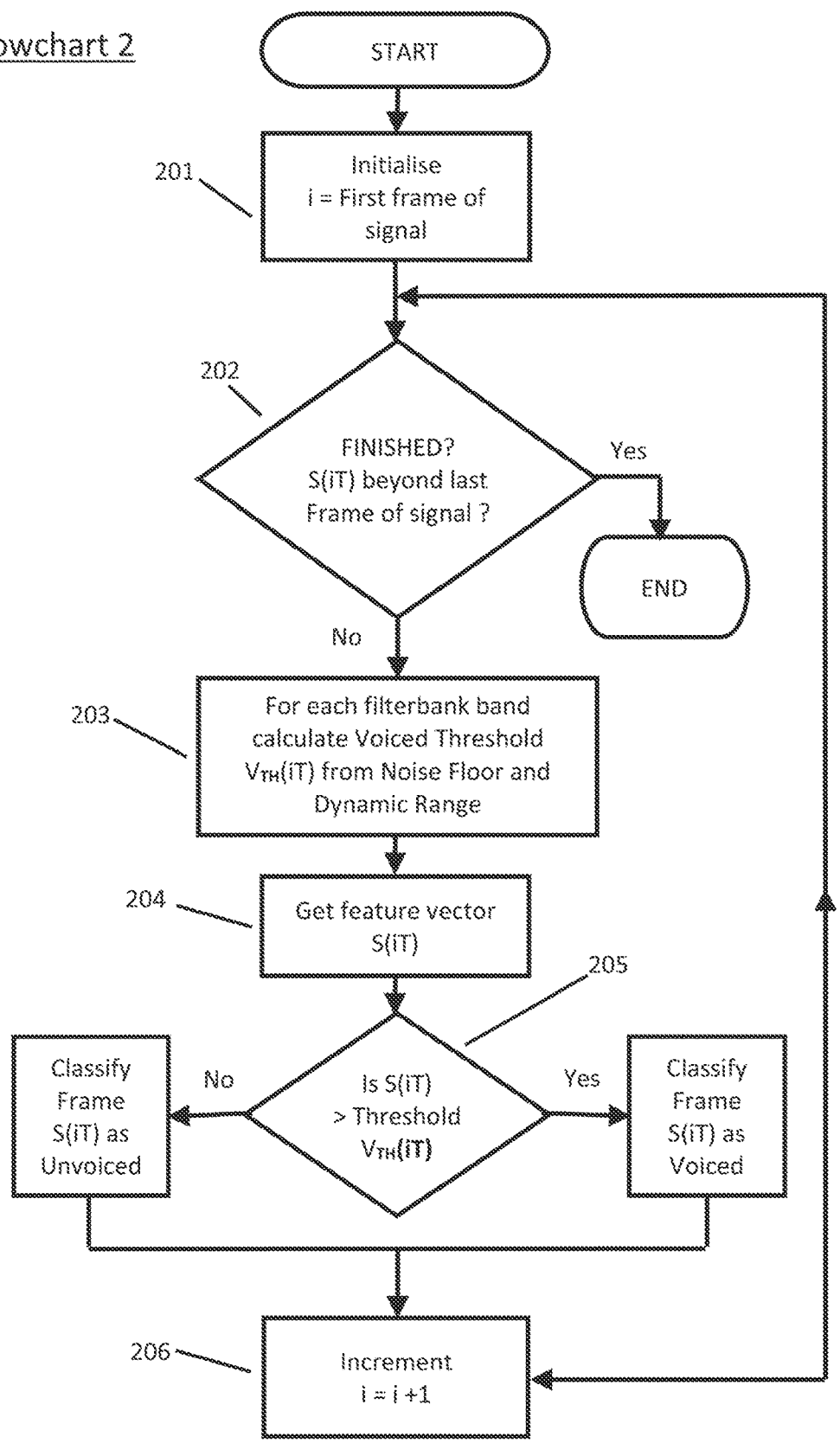
FIG. 9 is a flow diagram (Flowchart 2) illustrating classifying the frames of the guide audio signal and the dub audio signal.
Figure 10:
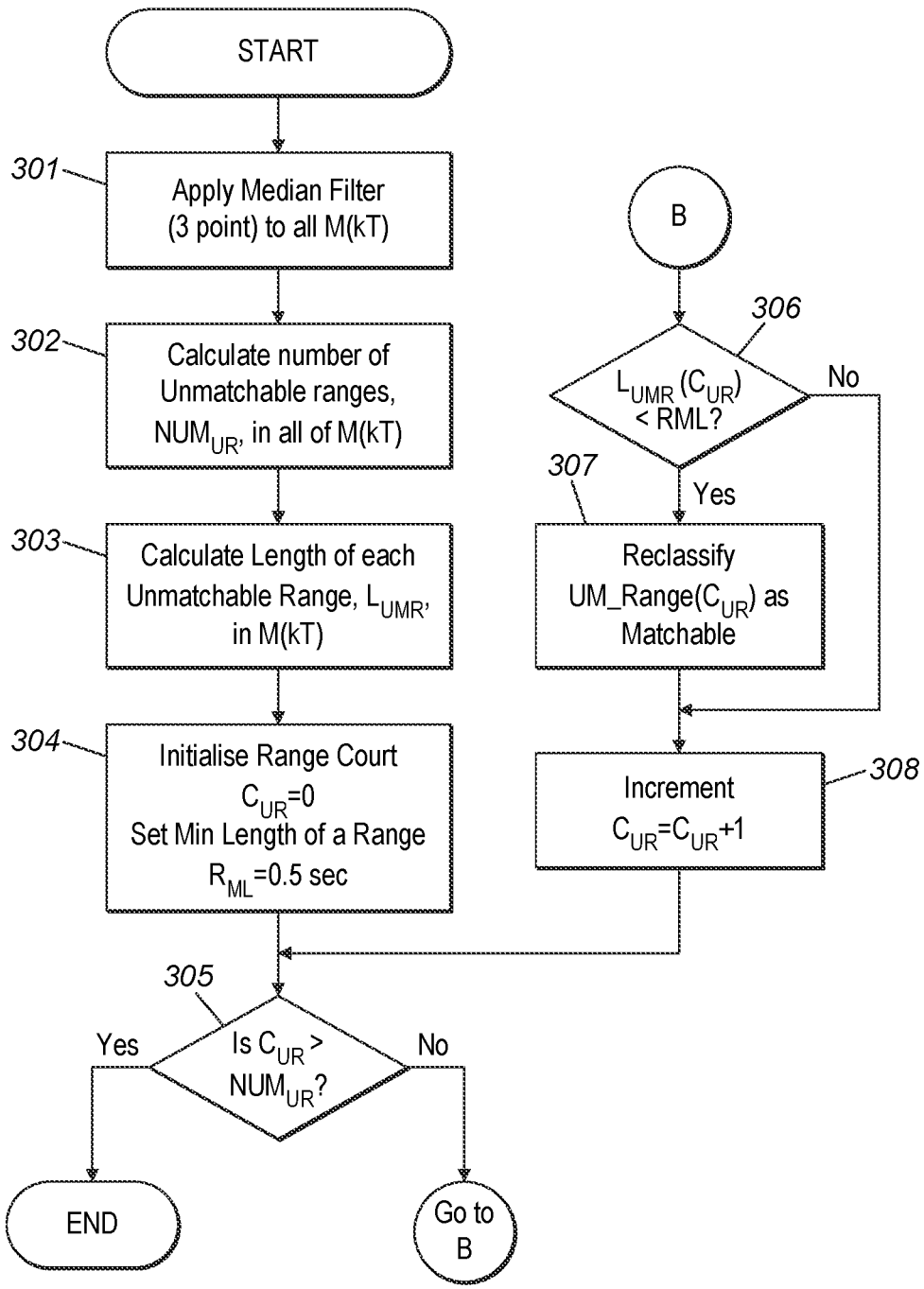
FIG. 10 is a flow diagram (Flowchart 3) illustrating a filtering step of the matchable ranges calculated in FIG. 8.

This set of processing is referred to as pre-processing which includes calculating the matchable ranges (FIG. 8, Flowchart 1) with a sub-process (FIG. 9, Flowchart 2) and filtering the matchable signal (FIG. 10, Flowchart 3). The processing described in Flowcharts 1, 2 and 3 is used to generate a Matchable signal M(kT) as shown in FIG. 7 which, for simplicity can have values of 1 for matchable and 0 for unmatchable. The resultant aligned Dub signal is shown in FIG. 7.

Figure 8:
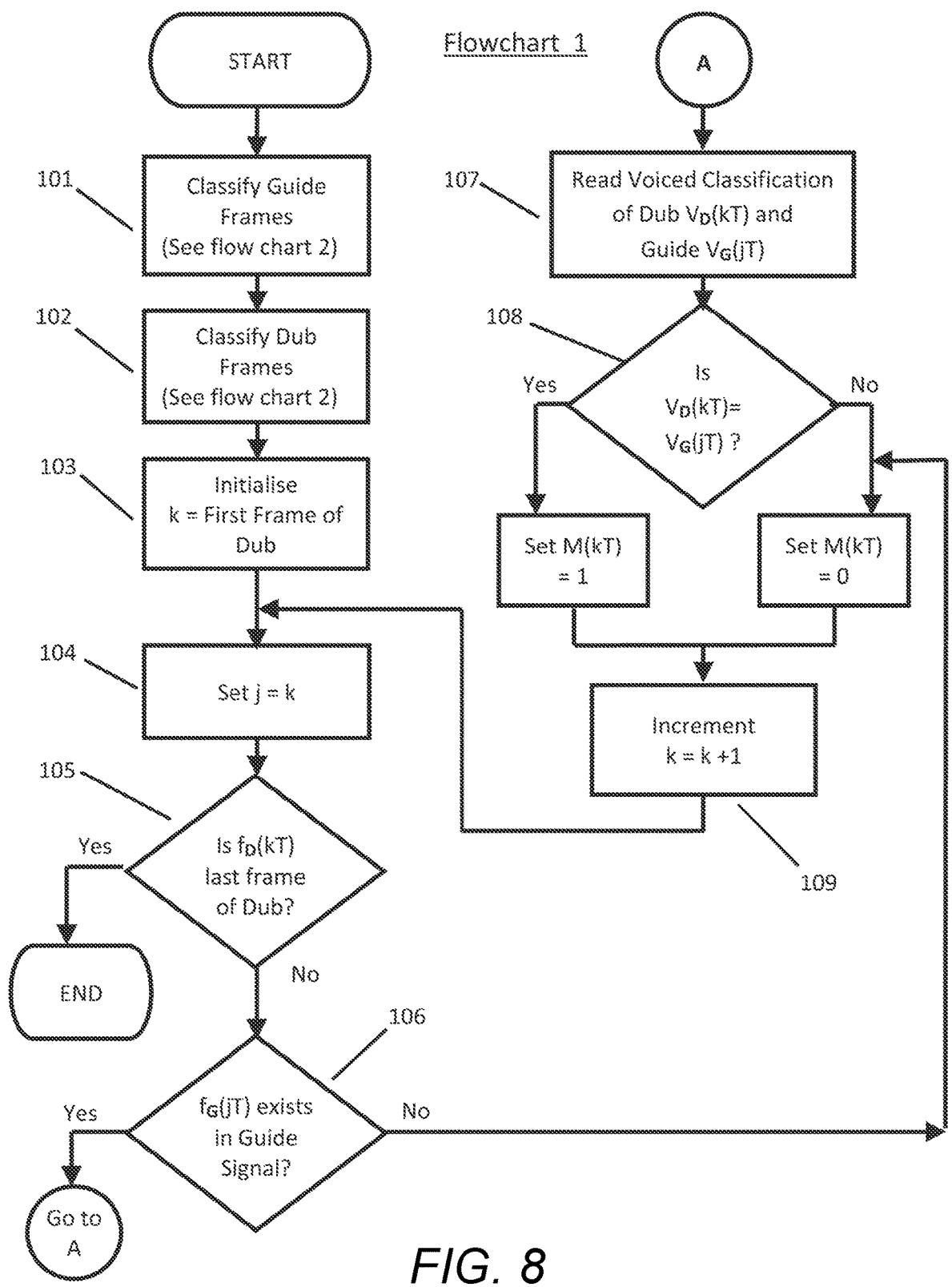
FIG. 8 is a flow diagram (Flowchart 1) illustrating a pre-processing step for calculating matchable ranges within the guide audio signal and dub audio signal.

The process of calculating the matchable ranges is shown in FIG. 8 (Flowchart 1). The process starts with classifying the Guide frames and the Dub frames at steps 101 and 102, which are described in more details in Flowchart 2 illustrated in FIG. 9. The processing then starts at a step 103 at the first frame of the audio dub signal (k is set to be 1), and control flows to step 104. A reference of j=k is set at a step 104. The processing is controlled at a step 105. The processing is allowed to continue a following step 106 until the $f_D(kT)$ of the last frame, which then goes to 'END'. Step 106 further determines if the Guide signal includes a feature vector $f_G(jT)$. If yes, the processing is continued from process 'A' as shown in FIG. 8. If no $f_G(jT)$ in Guide signal, a matchable signal vector M(kT) is directly set to be 0 for that frame. Process 'A' starts with a step 107 to read the voiced classification of Dub $V_D(kT)$ and Guide $V_G(jT)$ and matchable signal vector M(kT) is set at a step 108: M(kT)=1, if $V_D(kT)=V_G(jT)$; or M(kT)=0, if $V_D(kT) \neq V_G(jT)$. The frame value is then incremented (k=k+1) at a step 109 and the processing returns to the step 104.

FIG. 9 shows Flowchart 2 as a sub-process to classify the Guide and Dub signal frames as 'voiced' or 'unvoiced'. The term 'voiced' can be extended to include instrumental and other audio that contains periodic or high-energy content. The processing starts at a step 201 from the first frame (i=first frame) of signal. The processing is controlled by a following step 202 and directed to a following step 203 for calculating a voiced threshold $V_{TH}(iT)$ by Noise Floor and Dynamic Range for each filterbank frame, until the processing is determined to be 'FINISHED' at step 202. The voiced threshold may be used to define a sufficient signal level. The signal feature vector S(iT) is then pulled out at a step 204 and compared with the calculated voiced threshold $V_{TH}(iT)$ at a step 205. If $S(iT) > V_{TH}(iT)$, the frame S(iT) is classified as 'voiced' at the step 205, if NOT, the frame the frame S(iT) is classified as 'unvoiced' at the step 205. The frame value is then incremented (i=i+1) at a step 206 and the processing returns to the step 202 and is repeated.

FIG. 10 shows a set of subsequent processes after the Flowcharts 1 and 2 for filtering the matchable signal M(kT). This step removes unmatchable ranges (e.g. small gaps) in the matchable function that the time alignment algorithm can already deal with. This process starts from a step 301 to apply a Median filter to all matchable signal M(kT). The Median filter may have a typical length 3 for example. This is followed by a step 302 for calculating the number of unmatchable ranges $NUM_{UR}$ in all of M(kT), and a step 303 for calculating the time length of each unmatchable range in M(kT). The processing then starts at a step 304 from the first Range Count $C_{UR}$ at $C_{UR}=0$ (where $C_{UR}$ is an integer), at the same time, setting a minimum length of range $R_{ML}=0.5$ sec. $C_{UR}$ and $NUM_{UR}$ is compared at a following step 305. If $C_{UR} > NUM_{UR}$, it may indicate that there is no unmatchable range counted, therefore, the procedure may go to 'END'. If NOT, the processing is continued from a set of processes at 'B' as shown in FIG. 10. From process B, the time length of the unmatchable range $L_{UMR}$ is compared with the pre-set minimum length of range $R_{ML}$ at a step 306. If the time length of the unmatchable range is less than the pre-set $R_{ML}$ (e.g. 0.5 sec), the unmatchable range is reclassified as a matchable range at a step 307. If the time length of the unmatchable range is not less than the pre-set $R_{ML}$, this unmatchable range is 'filtered out'. The value of $C_{UR}=C_{UR}+1$ is then incremented and the processing then returns back to the step 305.

In some embodiments, once the matchable ranges have been created as described in Flowcharts 1 to 3, an extended time range in the Guide may be found. This may be an important step for setting the start of the Guide signal range to time-align based on the Dub's "Voiced" classification range. Adding this step may provide a wider range for a following time-alignment algorithm to compare the Guide to the Dub audio signals, thereby giving more possible and plausible solutions in which to choose the optimum time alignment path from. This may be achieved by extending an amount of time prior to and after the start and end boundaries respectively of the most likely mistiming sections between the guide and dub segments.

Figure 11:
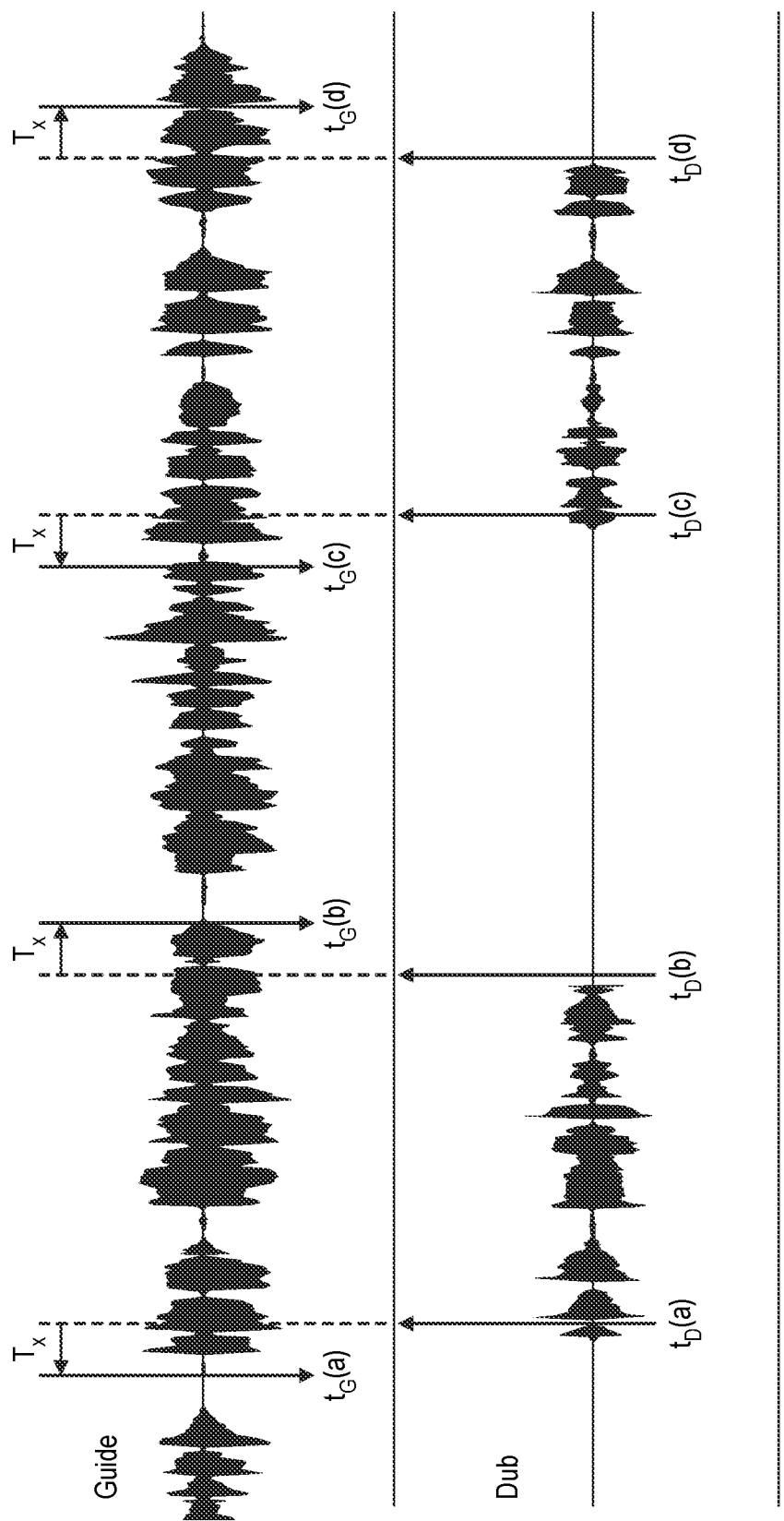
FIG. 11 is a schematic illustration of processed signal for improved processing.

FIG. 11 shows an example of this configuration comprising typical Guide and Dub audio signals. A maximum extension variable $T_x$ may be set (e.g. 0.25 sec). Successive ranges of the start and end of Voiced sections of the Dub signal are marked with pairs of up arrows as shown in FIG. 11, noted as $t_D(a)$ to $t_D(b)$, $t_D(c)$ to $t_D(d)$ and so on. In some embodiment, the extended pairs of start and end times for the Guide's sections may be set as follows (marked by pairs of down arrows) in the Guide time line, in order to determine where to set the start and end frame times for Guide ranges that correspond to the Dub's sections:

$$t_G(a)=t_D(a)-T_x \text{ to } t_G(b)=t_D(b)+T_x$$

$$t_G(c)=t_D(c)-T_x \text{ to } t_G(d)=t_D(d)+T_x$$

After the computing of the matchable ranges in block 500, the obtained matchable signals M(kT) may be input to a modified Time Alignment process 550, shown in FIG. 5. In this process, the matchable signal M(kT) is input to the part of the Time Alignment algorithm that compute the Alignment Path (or referred to as time warping path or time warping function w(jT)) where new modifications take into account the Guide and Dub frame-by-frame differences when they are deemed to match, but ignores these differences when they don't match.

In some embodiments, the Time Alignment process 550 may be modified based on the time alignment algorithm described in FIG. 5, in order to receive and utilize the M(kT) signal. In some embodiments, when M(kT) signifies that the feature vectors (e.g. spectral measurements) are in unmatchable ranges, it may be "useless" to compare the vectors and include their differences in the SCORE. Therefore, in terms of FIGS. 4a and 4b, the DIST results may be ignored in unmatchable ranges, which means that if either M(jT) or M(kT) is zero, then d(j,x) or d(x,k) would be set to 0, where x is any other integer index. Moreover, since it is not known if the path through an unmatchable range is going to be good or bad at any frame, there is no reason to add any additional "penalty" to the SCORE for steps which create time distortion in w(jT), i.e. a=0 or a=2, going from j to j+1. However, when there is no time distortion in the path, i.e. when a=1, since the penalty of 0 is added to the path SCORE, the most likely path mainly have values of k=k+1 when j=j+1, generating a 45 degree path segment in the (j,k) plane.

The matchable signal allows the alignment algorithm to work as normal when the Guide and Dub frames' features at j and k are matchable. In this case, the dissimilarity (DIST) measures d(j,k) between the vectors $f_G(jT)$ and $f_D(kT)$ may be used in computing the local path SCORE $S_p(j,k)$ and the final output time warping path w(jT) should successfully match timing features because the SCORE of dissimilarity is the lowest (meaning that the matched features are the most similar). However, when the two signals are not matchable at a (j,k) the distance measure d(j,k) is disregarded in computing the local path SCORE because the measurement is irrelevant. The normal time-stretching penalties for a=0 and a=2 generally will lead in this case to creating time warping paths increasing by one frame of k for each frame of j (i.e., a linear or a non-linear time warped alignment path, which may leave the dissimilar parts of the signal unaltered).

In some embodiments, the determined w(jT) may be further input to an editing processor 280 and a following signal modification processor 290. Although the processes in 280 and 290 are same as the prior art described in FIG. 1, the audible quality of the results will be improved by having better input alignment in the preceding stages (by processors 500 and 550). The timing and feature adjustment algorithm runs continuously through whole signal, from first Dub sample to the end sample. The current matching signal, defined as it is, it doesn't directly modify the "other" time varying feature measurements. Therefore there is no requirement to modify the subsequent editing processing of the timing or selected features of the Dub signal to match the Guide's.

Figure 12:
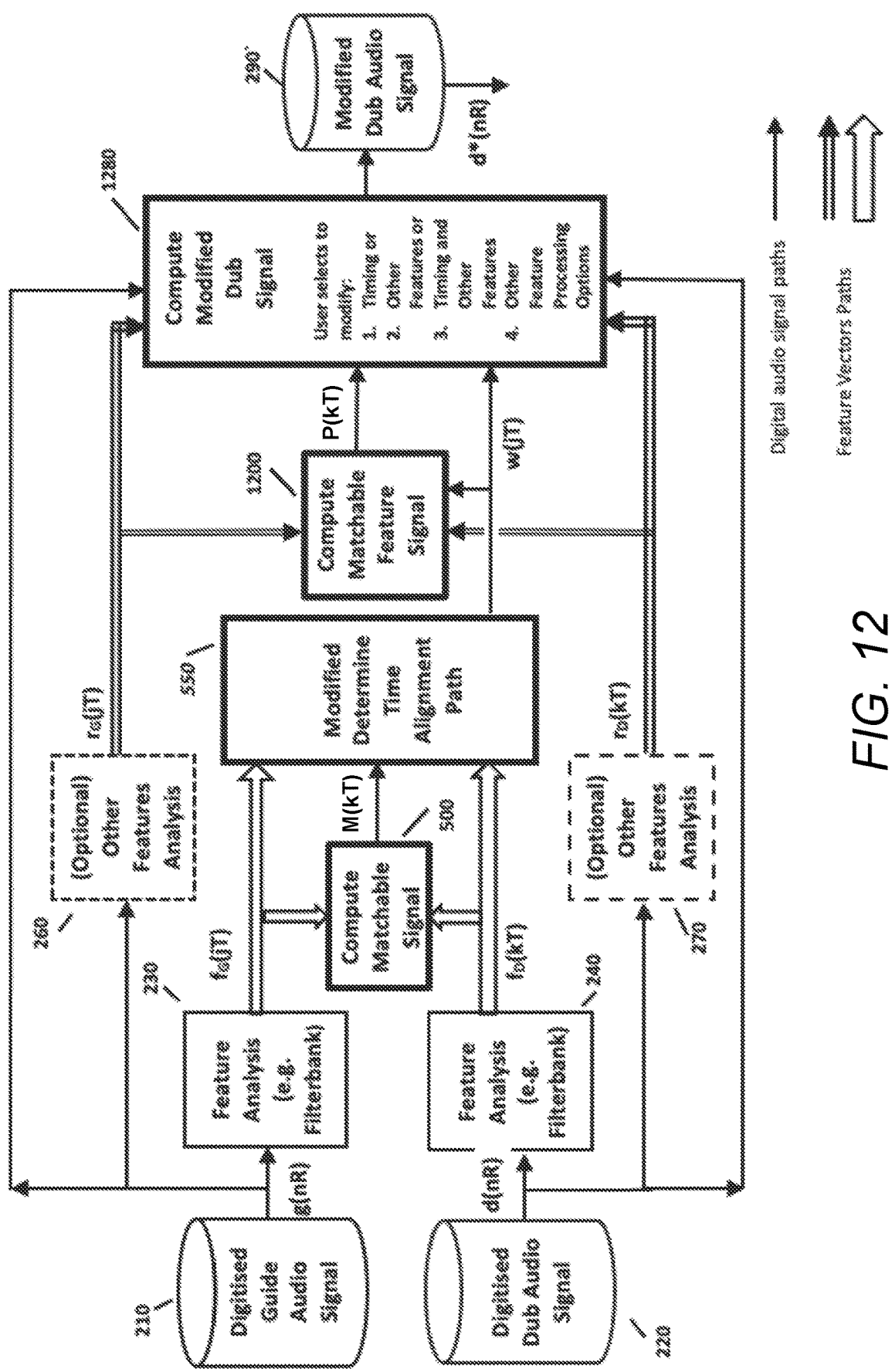
FIG. 12 is a functional block diagram illustrating a further embodiment of the invention.

However, in some other embodiments, with more detailed analysis of the feature vectors $r_G(jT)$ and $r_D(kT)$, further use of detecting and measuring additional discrepancies in corresponding aligned features such as pitch, loudness, phonetic or other classifiable measures could be incorporated into FIG. 12 illustrates a further example embodiment of the invention. To the extent that FIG. 12 operates in an identical manner to the operation of FIG. 5 further explanation will be omitted.

In FIG. 12, the alignment process provides a further technique for determining whether selected set of audio signal features in two signals that are to be compared are matchable, not just in time, but also in the sense of their signal components. In this regard, matchable can mean that the audio features and components are for example: first, occurring in both signals at similar times; and/or that they have similar ranges of values, such that the features in one signal could be modified to more closely match with those of the other signal; and third, occur in a range which could be modified by other means such that those values could be modified to be more suitable for the ultimate purpose of the signal. (e.g. a better-tuned harmony or double track for releasing a song digitally).

FIG. 12 is an enhancement of FIG. 5 and provides an overview of the added processing stages required to include the additional feature measurement 260 and 270; the determination of time-aligned matchability 1200 (which can be specified at multiple levels of matchability related to the actual feature); the computation of the matchability-selected modification method and parameters 1280 and, finally, the processing of the Dub signal 1280.

Figure 13:
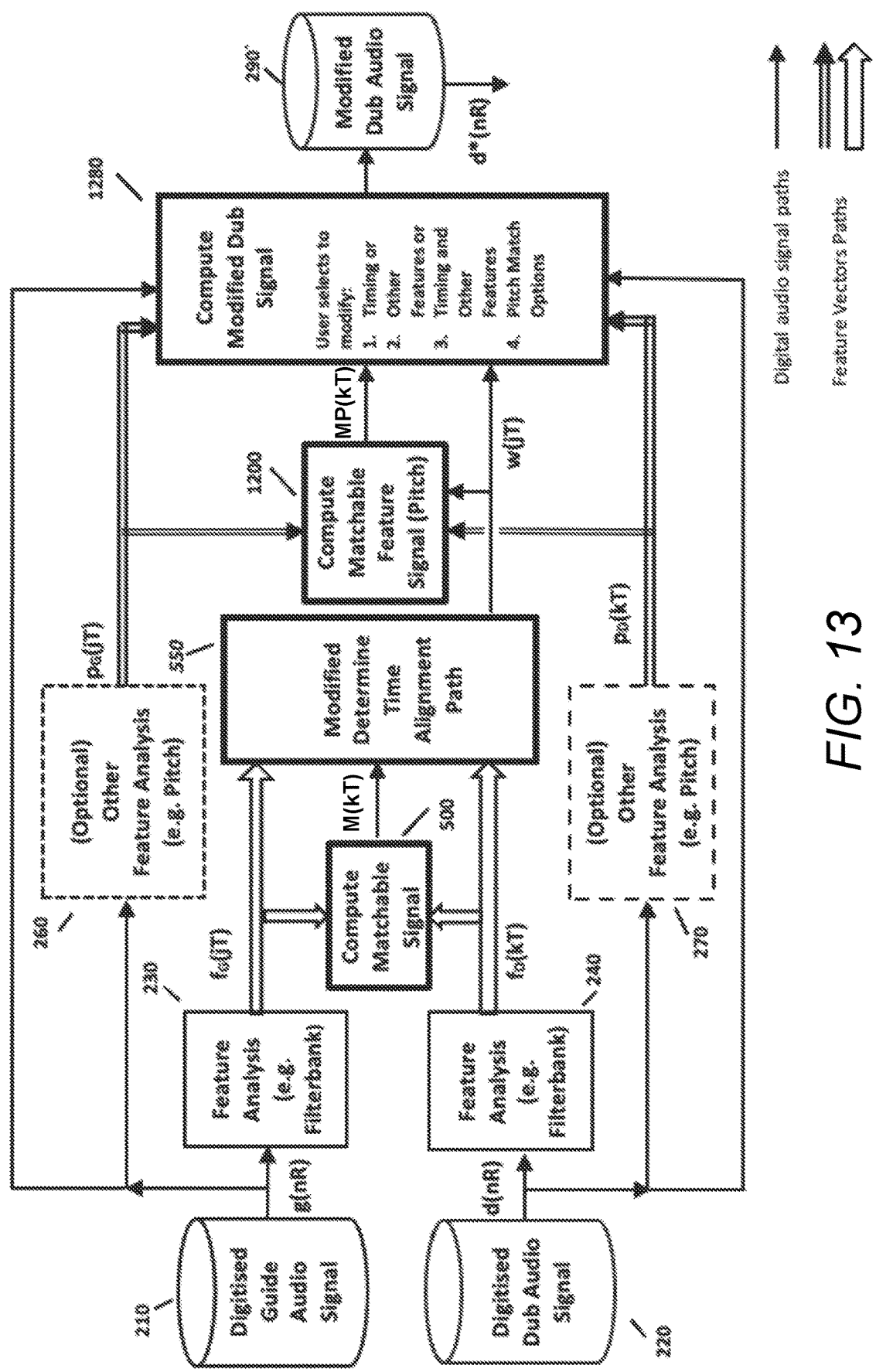
FIG. 13 is a functional block diagram illustrating a further embodiment of the invention.

FIG. 13 is an example of using the feature, Pitch, as the one being compared and modified. In boxes 260 and 270 of FIG. 13 the feature analysis is pitch analysis, such that $r_G(jT)=p_G(jT)$ and $r_D(kT)=p_D(kT)$, the pitch estimations of the Guide and Dub.

This method differs from the time-aligned feature processing described in U.S. Pat. No. 7,825,321B2 in that there was no measurement of degrees of matchability between the signals made, nor a selection of different processes to apply depending on the specified level or matching.

Figure 14:
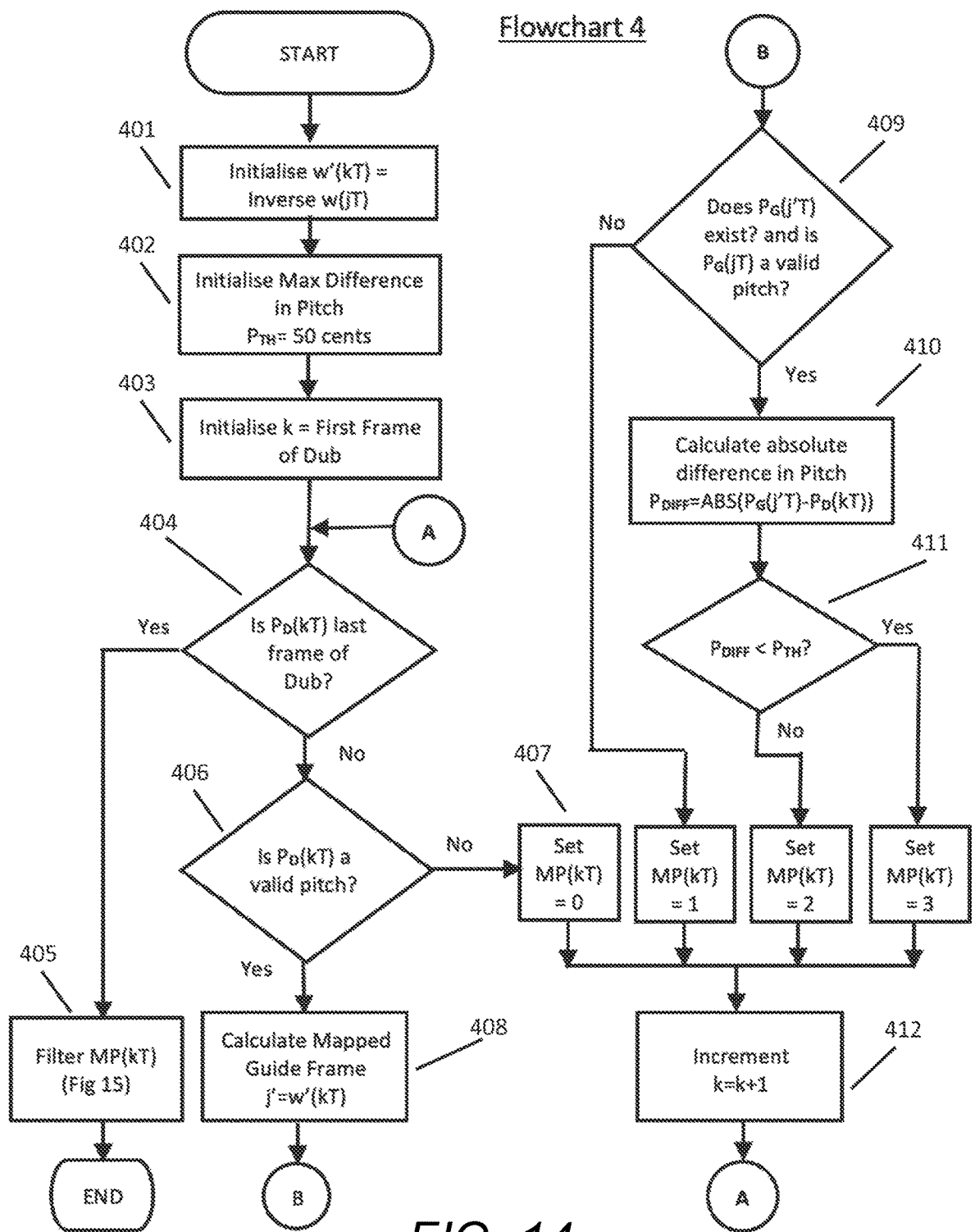
FIG. 14 is a flow diagram (Flowchart 4) illustrating a process for determining the matchability of audio features in respective frames of the guide and dub audio signals.

FIG. 14 is a flowchart illustrating the multi-level measurement of matchability for the example of comparing the pitch of the two different signals. As stated above, for absolute accuracy comparing two different signals, a time-mapping of corresponding features is required before a match at a particular Guide time T=jT can be made with the Dub. This is because with audio signals created by human performers, there normally will be some variability in timing, in a range say of up to 0.25 or 0.5 seconds, depending on whether the signal is music or dialogue.

In a first step (step 401) of FIG. 14, a time-map aligning the Guide to the Dub is derived, by inverting the alignment path w(jT) (refer to FIG. 3 for example) computed in block 550 of FIG. 12 to provide an array w'(kT).

The next consideration is in a step defining the appropriate set of different criteria to apply when determining the matchability of the specific feature in the guide audio signal and the dub audio signal, and the corresponding values of measurement ranges to map into a multi-level matchability signal. A simple first example of this process is given for modifying the Dub's level to match or follow the Guide's level.

Signal Levels of the Guide and Dub can be measured frame by frame (in dB for example) as in blocks 260 and 270 in FIG. 12. If the Guide and Dub signals meet the criteria of this process in being relatively closely aligned in sections, the Dub's level could be adjusted to match or follow the Guide's level according to a computed multilevel Matchability function shown as P(kT) in FIG. 12.

P(kT)=0 Uneditable—Dub level too low to adjust
P(kT)=1 Adjustable—Dub and guide levels too different, can use standard audio dynamics processing such as compression/expansion algorithms.
P(kT)=2 Adjustable and possibly matchable—differences (in dB) are large but Dub level might be relatable to Guide
P(kT)=3 Adjustable and matchable—Dub level can follow the Guide level with differences<a threshold (in dB)

Using pitch as a second example, a threshold condition of "Maximum Difference in pitch of 50 cents" may be chosen and set in step 402 (it will be appreciated the a cent is a logarithmic unit of measure for musical intervals, with one semitone being equal to 100 cents). With this example it is possible to define four levels of matchability of pitch, MP(kT), between the guide audio signal and the dub audio signal as follows:

MP(kT)=0 Always uneditable
MP(kT)=1—Tunable (to a specific scale for example)
MP(kT)=2—Tunable and possibly matchable to the Guide pitch where the difference is greater than a Maximum Difference in Pitch threshold, $P_{TH}$.
MP(kT)=3—Matchable to Guide (with difference<$P_{TH}$)

These are illustrated in FIG. 14 to the right of the 'no' branch part of decision step 406, as will be discussed later. A value of 0 for example can occur in situations where there is no measurable pitch in the Dub or the pitch is outside a reasonable range and not valid. This will occur in frames of the signal determined to be unvoiced for example. A value of 1 can occur if there is no pitch in the guide or its pitch is outside a normal frequency range. In this case other well-known methods could be used to tune the Dub's pitch. A value of 2 can occur if the pitch of the Guide is above the threshold $P_{TH}$ and is perhaps a harmony part, in which case known methods are available to tune the Dub to notes in a pitch grid or tune it using the methods in U.S. Pat. No. 7,825,321B2 but making its offset from the Guide appropriate musically. Lastly, a value of 3 is assigned when the Dub pitch is within the threshold of $P_{TH}$ and this method has been described fully in U.S. Pat. No. 7,825,321B2. These values are intended to be illustrative and not limiting.

Returning to step 403 of FIG. 14, processing then starts at the first frame of the audio dub signal (k is set to be 1), and control flows to step 404. As long as k does not indicate that the last frame of the dub audio signal has been reached, then in step 406, the pitch of the frame in the audio dub signal is determined to be a valid pitch by comparison with a predetermined absolute range of expected pitches. Human performers for example will typically have pitches in the range of a few hundred Hz for example.

If the pitch of the dub audio signal is determined not to be valid in step 406, then the matchability level for the frame is set to be zero in step 407, based on the matchability levels discussed above. However, if the pitch of the dub signal is determined in step 406 to be a valid pitch, that is within an expected reasonable range, then the method proceeds to compare for each frame the pitch measurement of the audio dub signal to that of the time-mapped guide. This process begins in step 408, which follows after the yes branch of decision step 406.

In step 408, the value of the time mapped guide audio signal, j'=w'(kT) is determined for the present frame k in the dub audio signal, and in step 409 it is determined whether the pitch of the guide signal is a valid pitch. Again, this is determined with reference to an expected range of pitches for the guide signal. A pitch may be invalid if there is no pitch in the guide or its pitch is outside a normal frequency range. If the pitch of the guide audio signal is determined to be invalid, then the MP(kT) is set to have a value of 1.

Assuming both the pitch of the dub audio signal and the pitch of the guide audio signal are determined to be valid pitches for comparison, a comparison of the actual pitch values of both the dub and guide signals is calculated in step 410 to determine whether the pitch of the two signal is within the threshold of 50 cents or outside. In step 411, the pitch of the dub signal in the present frame k is therefore compared with the pitch of the time-mapped guide signal. If the two pitches are not within the threshold of 50 cents, then the matchability value of MP(kT) is set to be 2. If the two pitches are within the threshold of 50 cents, then the matchability value of MP(kT) is set to be 3. In step 412, the frame value of the dub signal is then incremented and the processed returns to step 404. Thus, the processed repeats until the Dub's last frame is reached to determine whether the matchability found is 0, 1, 2 or 3 as described above. This process produces a matchability signal or vector MP(kT) representing the frame-by-frame matchability of the pitch in both the dub and time-mapped guide audio signals.

Figure 15:
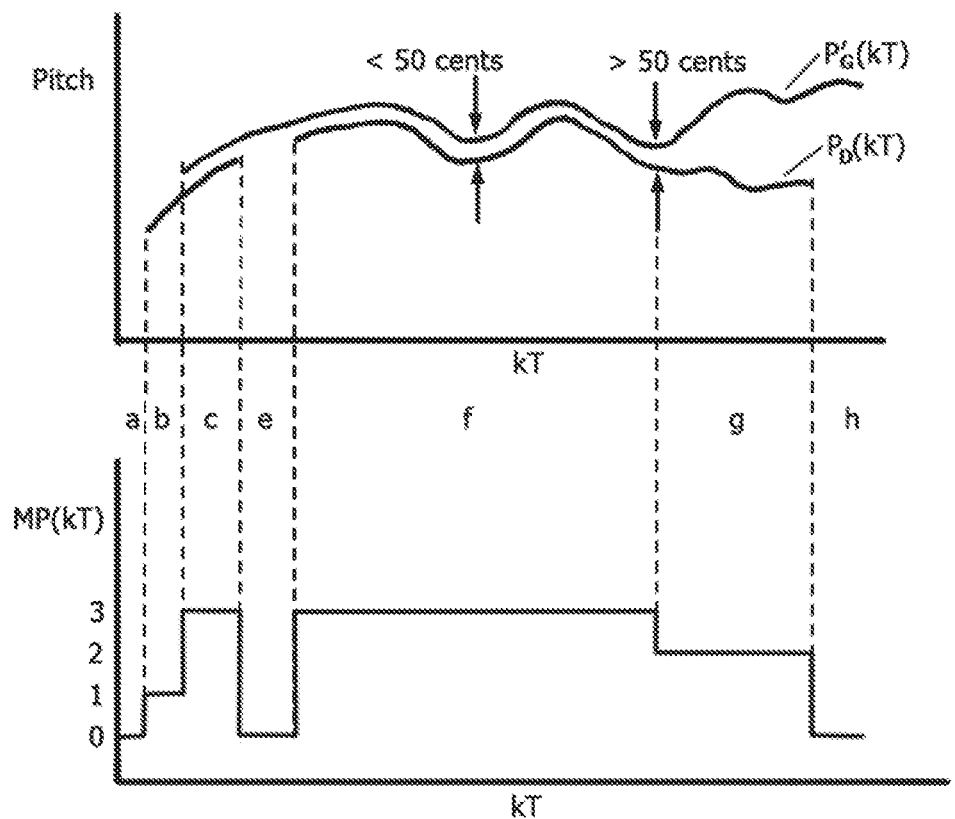
FIG. 15 is a graphical illustration of a pitch profile for a Guide audio signal and a Dub audio signal and a corresponding multi-level matchability profile.

As an example of determining the multi-level matchability, FIG. 15 shows inverse time-warped Guide and Dub pitch contours, $P'_G(kT)$ and $P_D(kT)$ respectively, and a corresponding MP(kT) profile that would be output from block 1200 in FIG. 13. The two corresponded profiles are divided into seven different regions by the dotted lines, namely a, b, c, e, f, g, and h.

At regions a, e and h, the Dub signal does not have a pitch signal which means $P_D(kT)$ is not a valid pitch, so MP(kT)=0. At region b, $P_D(kT)$ is a valid pitch but $P'_G(kT)$ does not exist. Therefore, this gives rise to MP(kT)=1. At regions c and f, $P_D(kT)$ is a valid pitch and $P'_G(kT)$ exists. The difference $P_{DIFF}$ between $P_D(kT)$ and $P'_G(kT)$ is calculated at step 410 in FIG. 14. The calculated $P_{DIFF}$ is less than the threshold 50 cents which leads to MP(kT)=3. At region g, although $P_D(kT)$ is a valid pitch and $P'_G(kT)$ exists, the difference $P_{DIFF}$ between $P_D(kT)$ and $P'_G(kT)$ is larger than 50 cents. This gives rise to MP(kT)=2.

Once the dub signal has been processed, and the end frame k has been reached (yes, in step 404), control passes to step 405 where the signal MP(kT) is filtered. This process is described in FIG. 16 below.

Figure 16:
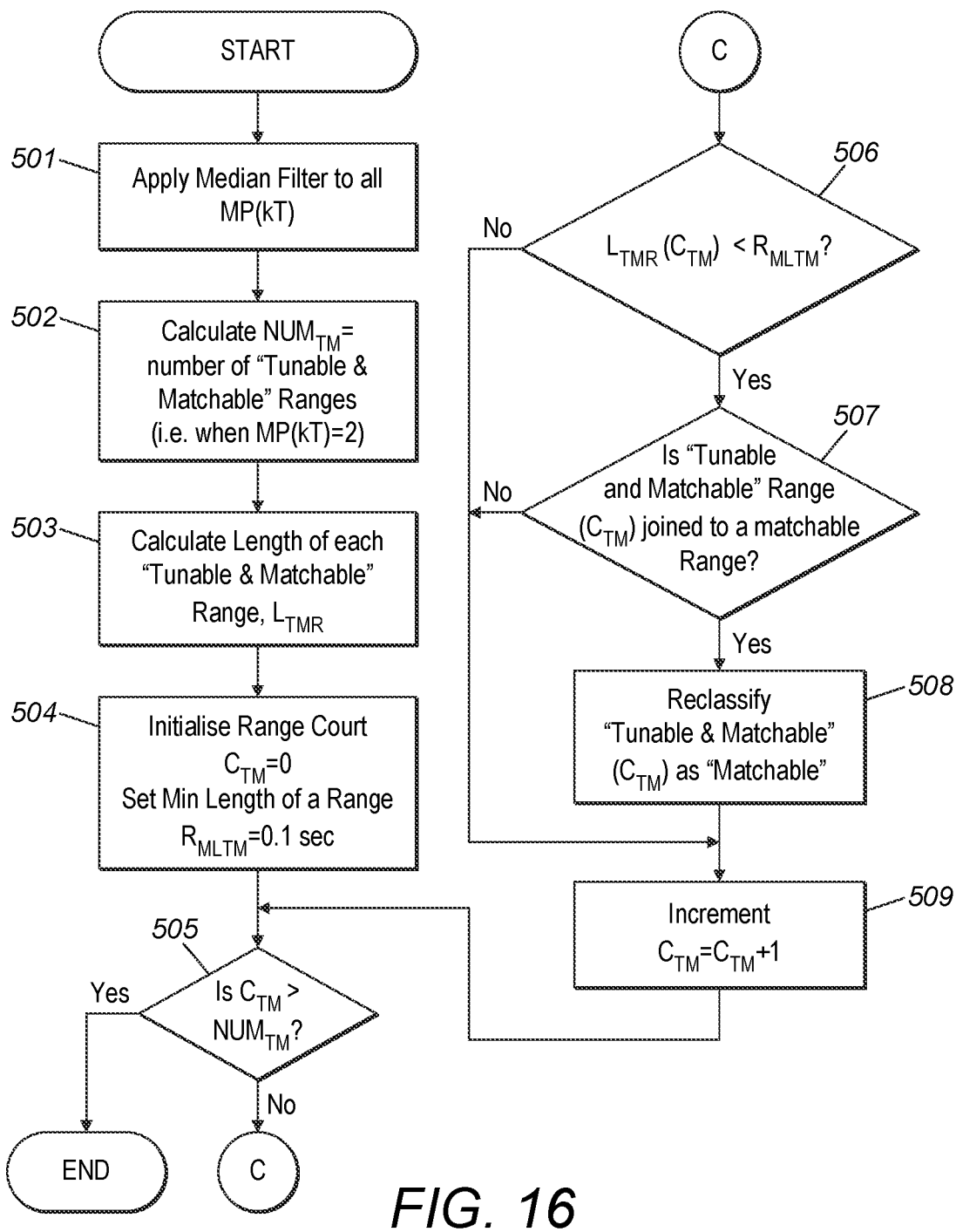
FIG. 16 is a flow diagram (Flowchart 5) illustrating processing for filtering of the matchability signal resulting from the process of FIG. 14.

Once the raw Matchability signal MP(kT) has been computed for the entire Dub signal, the processing described in FIG. 16 begins. In step 501, a median filter is applied to the values in the signal MP(kT) in order to smooth large discrepancies in the signal. The median filter may have a typical length 3 for example. In steps 502 to 505, the processing analyses the signal MP(kT) to filter and reclassify any NOT "Tunable and Matchable" ranges below a certain length, such that values assigned in the process of Flowchart 4 should be reclassified as MP(kT)=2 in order to ensure continuity of the processing, which follows in FIG. 13 block 1280. Firstly, in step 502 the number of "Tunable and Matchable" ranges $NUM_{TM}$ is calculated, such as when MP(kT)=2 as set in FIG. 14. In a following step 503, the length of each of the "Tunable and Matchable" range is calculated. After the number of "Tunable and Matchable Ranges" is established and the length of each "Tunable and Matchable" is calculated, the following steps are set to inspect for gaps between successive ranges of MP(kT)=2 being shorter than a threshold value of 0.1 sec. If such a gap exists, the values are replaced with a 2. The processing then starts at a first Range Count $C_{TM}=0$, with a setting of a minimum length of a Range $R_{MLTM}=0.1$ sec. The processing is controlled at a step 505 where the values of $C_{TM}$ and $NUM_{TM}$ are compared. If $NUM_{TM}$ is NOT smaller than $C_{TM}$, the processing is continued from process 'C', until $C_{TM} > NUM_{TM}$ which indicates that the processing may go to 'END'.

The process 'C' starts at a step 506 which determines if the length of the "Tunable and Matchable" range $L_{TMR}$ at the Range Count $C_{TM}$ is smaller than $R_{MLT}$. If yes, this indicates that a small gap exists in the "Tunable and Matchable", but may be 'smoothed' into the "Tunable and Matchable" range and considered as a matchable range. This is confirmed at a step 507 which determines if the "Tunable and Matchable" range can be joined to a matchable range. If yes, this recognized small gap is reclassified as 'Matchable' at a step 508. Returning to steps 506 and 507, if the length of the "Tunable and Matchable" range $L_{TMR}$ at the Range Count $C_{TM}$ is NOT smaller than $R_{MLT}$, or the "Tunable and Matchable" range can NOT be joined to a matchable range, the Rang Count $C_{TM}$ value of is then incremented ($C_{TM}=C_{TM}+1$) at a step 509 and the processing returns to the step 505.

The final multilevel pitch matchability signal MP(kT) then feeds block 1280 in FIG. 13 to be combined with user-selected processing decisions for one or more of the states of matchability. Referring again to FIG. 13, the user input can select between items 1 to 4, which include modifying the Dub signal with one or more of the Guide signal's features including (1) Timing, (2) Other Features, (3) Timing and other Features. As described previously and shown in FIG. 5, the methods used in these three selections were described in U.S. Pat. No. 7,825,321B2. The embodiment of the FIG. 13 allows these processes to be turned on and off at the appropriate corresponding time positions using at least a two level Matchability signal which takes into account timing discrepancies between the Guide and Dub features. In FIG. 13, as noted above, an additional selection is provided specifically for (4) a Pitch Match Option. Example of the Pitch Match Processing Options that may be user-requested or automatically assigned depending on the signal differences (indicated by the matchability signal), include the following:

a) Processing of the Dub's pitch to more closely match the Guide's pitch as described in U.S. Pat. No. 7,825,321B2 and executed commercially in VocAlign Ultra and Revoice Pro from Synchro Arts when MP(kT)=3 or 2 (using further information from the neighbouring frames pitch and other data to assess the likelihood of needing modification). In U.S. Pat. No. 7,825,321B2, it is taught that if the Dub pitch at (kT) is within a defined pitch difference threshold, no pitch adjustment is applied;

b) Use well-known tuning methods to tune the Dub Pitch to a chromatic or musical scale reference grid when MP(kT)=1; and/or c) Do nothing, when MP(kT)=0 for example.

The block diagrams and flowcharts discussed above are intended to illustrate the operation of an example implementation of systems, methods, and computer program products according to various embodiments of the present invention. Each block in the flowchart or block diagram may represent a separate module comprising one or more executable computer instructions, or a portion of an instruction, for implementing the logical function specified in the block. The order of blocks in the diagram is only intended to be illustrative of the example. In alternative implementations, the logical functions illustrated in particular blocks may occur out of the order noted in the figures. For example, two blocks shown as adjacent one another may be carried out simultaneously or, depending on the functionality, in the reverse order. Each block in the flowchart may be implemented in software, hardware or a combination of software and hardware.

Computing devices on which the invention is implanted may include a desktop computer, a laptop computer, a tablet computer, a personal digital assistant, a mobile telephone, a smartphone, an internet enabled television, an internet enabled television receiver, an internet enabled games console or portable games device. In all embodiments, it will be understood that the control logic represented by the flowcharts and block diagrams will be stored in memory implemented in or accessible by the computer. This logic stored in a memory of the computing device can be loaded into a real time memory of the processor for real time operation.

Although described separately, the features of the embodiments outlined above may be combined in different ways where appropriate. Various modifications to the embodiments described above are possible and will occur to those skilled in the art without departing from the scope of the invention which is defined by the following claims.

The invention claimed is:

1. A computer implemented method for modifying one or more features of an input audio signal based on one or more features in a guide audio signal, the method comprising:
dividing the guide audio signal and the input audio signal into a plurality of time frames;
analysing the plurality of time frames in the guide audio signal and the plurality of time frames in the input audio signal;
classifying the plurality of time frames into time frames with a sufficient signal level and time frames with an insufficient signal level;
determining a matchability signal by comparing one or more audio features of the plurality of time frames with a sufficient signal level in the guide audio signal with one or more corresponding features of the plurality of corresponding time frames with a sufficient signal level in the input audio signal, the matchability signal indicating matchable sections of the input audio signal having audio features that can be modified to match the guide audio signal, and unmatchable sections of the input audio signal having audio features that cannot be modified to match the guide audio signal;
labelling each of the plurality of time frames as a matchable or unmatchable section of the input audio signal based at least in part on the matchability signal for each of the plurality of time frames;
relabelling any unmatchable section of the input audio signal as a matchable section of the input audio signal where the unmatchable section of the input audio signal has a length of time that is less than a pre-set minimum length;
filtering any unmatchable section of the input audio signal where the unmatchable section of the input audio signal has a length of time that is greater than the pre-set minimum length; and
modifying one or more audio features in the matchable sections of the input audio signal.

2. The computer implemented method of claim 1, comprising:
generating a time-alignment path mapping the timing of one or more features of the input audio signal to the corresponding features in the guide audio signal; and
based on the time-alignment path, modifying the at least one feature in the matchable sections of the audio input signal.

3. The computer implemented method of claim 2, comprising:
based on the matchability signal, modifying the matchable sections of the input audio signal such that one or more features in the input audio signal are matched to the guide audio signal; and/or
selectively modifying the timing features of the unmatchable sections of the input audio signal.

4. The computer implemented method of claim2, wherein the determination of whether a frame has an insufficient signal level comprises:
determining the noise floor and/or dynamic range of the guide audio signal and input audio signals in each respective time frame of the plurality of time frames;
determining a signal threshold based on the determined noise floor and dynamic range; and
comparing the guide audio signal and input audio signal in each respective time frame against the signal threshold.

5. The computer implemented method of claim 4, wherein analysing and classifying the frames of the guide audio signal and the input audio signal into sufficient and insufficient signal, comprises classifying the frame as being voiced or unvoiced, with reference to the noise floor and/or dynamic range of the guide audio signal and input audio signals, and a voiced threshold.

6. The computer implemented method of claim 1, wherein determining the matchability signal comprises dividing the input guide audio signal and input audio signals into a plurality of time frames.

7. The computer implemented method of claim 1, comprising:
depending on the matchability value assigned to each time frame, selecting one of a plurality of different predetermined types of audio processing to apply to the time frame of the input audio signal.

8. The computer implemented method according to claim 1, wherein the at least one feature of the audio signal to be modified includes one or more of: the timing of the audio signal, pitch, loudness, frequency, spectral energy, and/or amplitude.

9. The computer implemented method according to claim 1, wherein the matchability signal is determined based on one or more of: the timing of the audio signal, pitch, loudness, frequency, spectral energy, and/or amplitude.

10. A system for modifying one or more features of an input audio signal based on one or more features in a guide audio signal, the system comprising a processor configured to:

divide the guide audio signal and the input audio signal into a plurality of time frames;

analyse the plurality of time frames in the guide audio signal and the plurality of time frames in the input audio signal;

classify the plurality of time frames into frames with a sufficient signal level and time frames with an insufficient signal level;

determine a matchability signal by comparing one or more audio features of the plurality of time frames with a sufficient signal level in the guide audio signal with one or more corresponding features of the plurality of time frames with a sufficient signal level in the input audio signal, the matchability signal indicating matchable sections of the input audio signal having audio features that can be modified to match the guide audio signal, and unmatchable sections of the input audio signal having audio features that cannot be modified to match the guide audio signal; and label each of the plurality of time frames as a matchable section or an unmatchable section of the input audio signal based at least in part on the matchability signal for each of the plurality of time frames;

relabel any unmatchable section of the input audio signal as a matchable section of the input audio signal where the unmatchable section of the input audio signal has a length of time that is less than a pre-set minimum length;

filter any unmatchable section of the input audio signal where the unmatchable section of the input audio signal has a length of time that is greater than the pre-set minimum length; and modify one or more audio features in the matchable sections of the input audio signal.

11. The system of claim 10, wherein the processor is configured to:

generate a time-alignment path mapping the timing of one more features of the input audio signal to the corresponding features in the guide audio signal; and based on the time-alignment path, modifying the at least one feature in the matchable sections of the audio input signal.

12. The system of claim 11, wherein the processor is configured to:

based on the matchability signal, modifying the matchable sections of the input audio signal such that one or more features in the input audio signal are matched to the guide audio signal; and/or selectively modifying the timing features of the unmatchable sections of the input audio signal.

13. The system of claim 9, wherein the determination of whether a frame has an insufficient signal level comprises:

determining the noise floor and/or dynamic range of the guide audio signal and input audio signals in each respective time frame of the plurality of time;

determining a signal threshold based on the determined noise floor and dynamic range; and comparing the guide audio signal and input audio signal in each respective time frame against the signal threshold.

14. The system of claim 13, wherein analysing and classifying the frames of the guide audio signal and the input audio signal into sufficient and insufficient signal, comprises classifying the frame as being voiced or unvoiced, with reference to the noise floor and/or dynamic range of the guide audio signal and input audio signals, and a voiced threshold.

15. The system of claim 10, wherein determining the matchability signal comprises dividing the input guide audio signal an input audio signals into a plurality of time frames.

16. The system of claim 9, wherein the processor is configured to:

depending on the matchability value assigned to each time frame, select one of a plurality of different predetermined types of audio processing to apply to the time frame of the input audio signal.

17. The system of claim 10, wherein the at least one feature of the audio signal to be modified includes one or more of: the timing of the audio signal, pitch, loudness, frequency, spectral energy, and/or amplitude.

18. The system of claim 10, wherein the matchability signal is determined based on one or more of: the timing of the audio signal, pitch, loudness, frequency, spectral energy, and/or amplitude.

* * * * *